US009687418B2

(12) United States Patent
Koike

(10) Patent No.: US 9,687,418 B2
(45) Date of Patent: Jun. 27, 2017

(54) MEDICATION CASSETTE

(71) Applicant: YUYAMA MFG. CO., LTD., Toyonaka-shi, Osaka (JP)

(72) Inventor: Naoki Koike, Toyonaka (JP)

(73) Assignee: YUYAMA MFG. CO., LTD., Toyonaka-shi (JP)

( * ) Notice: Subject to any disclaimer, the term of this patent is extended or adjusted under 35 U.S.C. 154(b) by 0 days.

(21) Appl. No.: 15/152,005

(22) Filed: May 11, 2016

(65) Prior Publication Data

US 2016/0250104 A1 Sep. 1, 2016

Related U.S. Application Data

(63) Continuation of application No. 14/377,791, filed as application No. PCT/JP2013/052921 on Feb. 7, 2013, now Pat. No. 9,365,308.

(30) Foreign Application Priority Data

Feb. 10, 2012 (JP) ................................ 2012-027340

(51) Int. Cl.
*B65G 47/24* (2006.01)
*B65G 47/22* (2006.01)
(Continued)

(52) U.S. Cl.
CPC ............ *A61J 7/0076* (2013.01); *B65B 37/12* (2013.01); *B65B 57/00* (2013.01); *G07F 9/026* (2013.01);
(Continued)

(58) Field of Classification Search
CPC ...... B65G 47/24; B65G 47/22; B65G 47/244; B65G 47/252; B65G 47/1457;
(Continued)

(56) References Cited

U.S. PATENT DOCUMENTS 5,369,940 A 12/1994 Soloman
5,400,893 A * 3/1995 Spatafora ............... B65B 37/12
198/392

(Continued)

FOREIGN PATENT DOCUMENTS

CN 103857608 A 6/2014
EP 2754627 A1 7/2014

(Continued)

OTHER PUBLICATIONS

International Preliminary Report on Patentability in PCT/JP2013/052921, Issued on Aug. 21, 2014 Authorized officer Yukari Nakamura of the International Bureau of WIPO.

(Continued)

*Primary Examiner* — James R Bidwell
(74) *Attorney, Agent, or Firm* — Masuvalley & Partners

(57) ABSTRACT

The invention addresses the problem of providing a medication cassette, which in addition to being capable of smooth automated dispensing despite being capable of storing large amounts of medication, allows accurate ascertainment of whether the medication has run out or is jammed. This medication cassette is provided with: a cylindrical body in which the medication is stored; a first rotating body capable of reciprocating movement inside the cylindrical body in the direction of the shaft center thereof; a second rotating body disposed on the outer circumference of the cylindrical body; a conveyed medication-detecting element for detecting medication that has been conveyed by the second rotating body; and a control for moving the first rotating body upward when a medication detection signal is not output from the conveyed medication-detecting element.

6 Claims, 29 Drawing Sheets

(51) Int. Cl.
*A61J 7/00* (2006.01)
*G07F 17/00* (2006.01)
*B65B 37/12* (2006.01)
*B65B 57/00* (2006.01)
*G07F 9/02* (2006.01)
*G07F 11/52* (2006.01)

(52) U.S. Cl.
CPC .......... *G07F 11/52* (2013.01); *G07F 17/0092* (2013.01)

(58) Field of Classification Search
CPC ......... B65B 35/06; B65B 35/26; B65B 37/08; B65B 37/12; B65B 57/00; G07F 9/026; G07F 17/0092; G07F 11/44; A61J 7/0076
USPC ......... 198/377.02, 379, 867.12, 803.14, 393, 198/396; 221/237, 224, 236
See application file for complete search history.

(56) References Cited

U.S. PATENT DOCUMENTS 7,182,201 B2 * 2/2007 Fujimura .......... H01L 21/67712 198/803.14
7,305,092 B2 * 12/2007 Mauro .................... H04L 29/06 380/247
8,827,112 B2 * 9/2014 Yuyama .................... A61J 7/02 221/224
9,242,785 B2 * 1/2016 Yuyama .................. B65B 35/06
9,365,308 B2 * 6/2016 Koike ................. G07F 17/0092
2004/0094386 A1 * 5/2004 Yuyama .................. G07F 11/42 198/347.1
2007/0145066 A1 * 6/2007 Knoth ..................... G07F 11/44 221/265
2007/0240968 A1 10/2007 Corbin
2008/0029530 A1 2/2008 Yuyama et al.

FOREIGN PATENT DOCUMENTS

| | | | |
|---|---|---|---|
| JP | 60-157414 | A | 8/1985 |
| JP | 01-51403 | B2 | 11/1989 |
| JP | 2007-82622 | A | 4/2007 |
| KR | 10-2009-0097419 | A | 9/2009 |
| TW | I 340715 | B1 | 4/2011 |
| WO | 2013/035692 | A1 | 3/2013 |

OTHER PUBLICATIONS

EPO, Extended European Search Report issued on Sep. 8, 2015 in European Patent Application No. 13746681.9, total 6 pages.

* cited by examiner

MEDICATION CASSETTE

CROSS-REFERENCE TO RELATED APPLICATIONS

This application claims priority under 35 U.S.C. §120 as a continuation of U.S. patent application Ser. No. 14/377,791, filed Aug. 8, 2014, which is a national phase application under 35 U.S.C. §371 of International Application Serial No. PCT/JP2013/052921, filed on Feb. 7, 2013, and claims priority under 35 U.S.C. §119 to Japanese Patent Application No. 2012-027340, filed on Feb. 10, 2012, which is hereby expressly incorporated by reference in their entirety for all purposes.

FIELD OF THE INVENTION

The present invention relates to a medication cassette.

DESCRIPTION OF THE RELATED ART

Conventionally, for instance, an apparatus for aligning and feeding small articles has been well-known which has a first rotating body in a disk shape rotated by a first driving means and a second rotating body in an annular shape rotated by a second driving means (for instance, see JP-B 1-51403).

However, in the conventional apparatus, the position relation between the first rotating body and the second rotating body is fixed, so that the number of articles capable of being stored is limited. The number of medications to be stored is desirably maximum so as not to frequently perform a filling operation. However, this is limited to be coped with by the first rotating body and the second rotating body having the configuration.

SUMMARY OF THE INVENTION

An object of the present invention is to provide a medication cassette which is capable of smooth automated dispensing according to the remaining number of stored medications despite being capable of storing a large number of medications.

According to an aspect of the present invention, a medication cassette includes: a cylindrical body in which medications are stored; a first rotating body which can be reciprocated in the cylindrical body in the direction of the shaft center thereof a second rotating body arranged on the outer circumference of the cylindrical body; conveyed medication detecting means detecting the medications conveyed by the second rotating body; and controlling means moving up the first rotating body when a medication detection signal is not outputted from the conveyed medication detecting means.

With this configuration, to fill the medications, the first rotating body is moved to one end side of the cylindrical body in the direction of the shaft center thereof so that a medication storing portion can be enlarged. To dispense the medications from the medication storing portion, the first rotating body is gradually moved to the other end side of the cylindrical body in the direction of the shaft center thereof so that the medications can be smoothly conveyed to the second rotating body.

The medication cassette includes discharged medication detecting means detecting the medications discharged to the outside of the second rotating body by the rotation thereof. When the time during which the medication detection signal is not outputted from the discharged medication detecting means exceeds a predetermined time, when the medications are not detected by the conveyed medication detecting means, the controlling means determines that medication running-out occurs.

When the time during which the medication detection signal is not outputted from the discharged medication detecting means exceeds the predetermined time, when the medications are detected by the conveyed medication detecting means, the controlling means may determine that an error occurs.

The cylindrical body can reciprocate the first rotating body in the direction of the shaft center thereof, and unrotatably guides the first rotating body in the circumferential direction. The cylindrical body further has a rotation driving mechanism which rotates the cylindrical body.

With this configuration, the first rotating body can be rotated via the cylindrical body by the rotation driving mechanism while being reciprocated in the direction of the shaft center thereof.

The medication cassette further includes: a raising/lowering mechanism reciprocating the first rotating body in the direction of the shaft center of the cylindrical body; and a clutch which can block power transmitted to the raising/lowering mechanism.

With this configuration, when the rotation of the first rotating body and the cylindrical body is inhibited due to medication clogging, the transmission of power is blocked by the clutch. Therefore, burnout in the rotation driving mechanism on which an excessive load acts can be prevented.

The medication cassette includes the raising/lowering mechanism reciprocating the first rotating body in the direction of the shaft center of the cylindrical body. The raising/lowering mechanism has a bearing member disposed between the first rotating body and a dimension variable member which can change the dimension in the shaft direction of the cylindrical body. The bearing member has a bearing rotatably supporting the first rotating body.

The medication cassette includes a regulation piece limiting the height of the medications conveyed in the circumferential direction by the second rotating body. The regulation piece has an auxiliary piece which can be raised and lowered and is projected into a space formed on the upper side at the time of lowering.

With this configuration, the height of the medications capable of being passed can be freely set. Even when the height is set to be low, a gap formed on the upper side can be covered by the auxiliary piece. Therefore, the passing of other medications through the gap and clogging occurrence can be reliably prevented from being caused.

The direction of the shaft center of the cylindrical body is tilted with respect to the vertical direction.

The direction of the shaft center of the cylindrical body coincides with the direction of the rotation shaft center of the first rotating body.

According to the present invention, the first rotating body can be reciprocated and rotated in the cylindrical body, so that by moving the first rotating body to one end side of the cylindrical body in the direction of the shaft center thereof, the medication storing portion can be increased in volume to be filled with a large number of medications. In addition, by gradually moving the first rotating body to the other end side of the cylindrical body, smooth automated dispensing can be made according to the remaining number of medications.

BRIEF DESCRIPTION OF THE DRAWINGS

FIG. 22 is seen from the opposite side.

PREFERRED EMBODIMENT

Hereinafter, an embodiment according to the present invention will be described with reference to the accompanying drawings. In the following description, the terms representing particular directions and positions (e.g., the terms including "up", "down", "side", and "end") will be used, if necessary. However, those terms are used for facilitating the understanding of the invention with reference to the drawings, and do not limit the technical range of the present invention by the meanings thereof. In addition, the following description is essentially illustrative only, and is not intended to limit the present invention, the applied objects thereof, or the application thereof.

(1. Overall Configuration)

Figure 3:
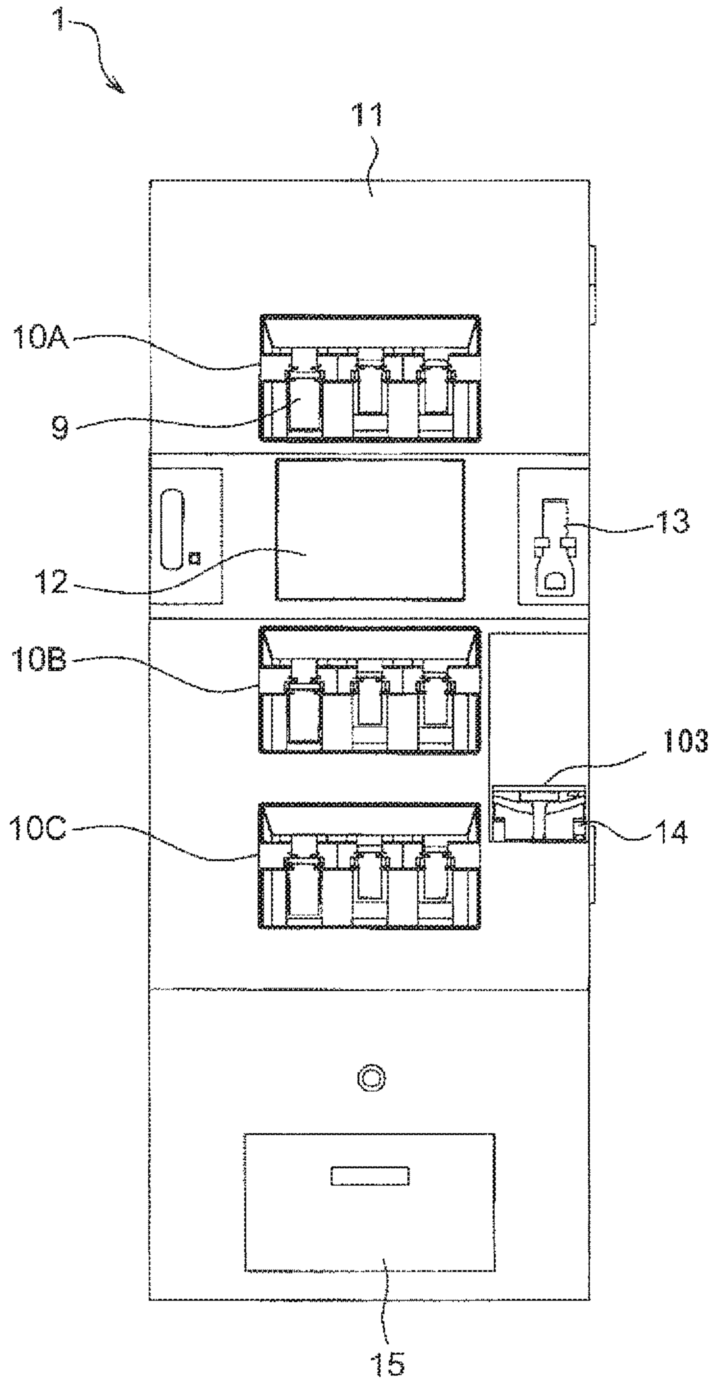
FIG. 3 is a front view of the medication filling apparatus of FIG. 1.
Figure 4:
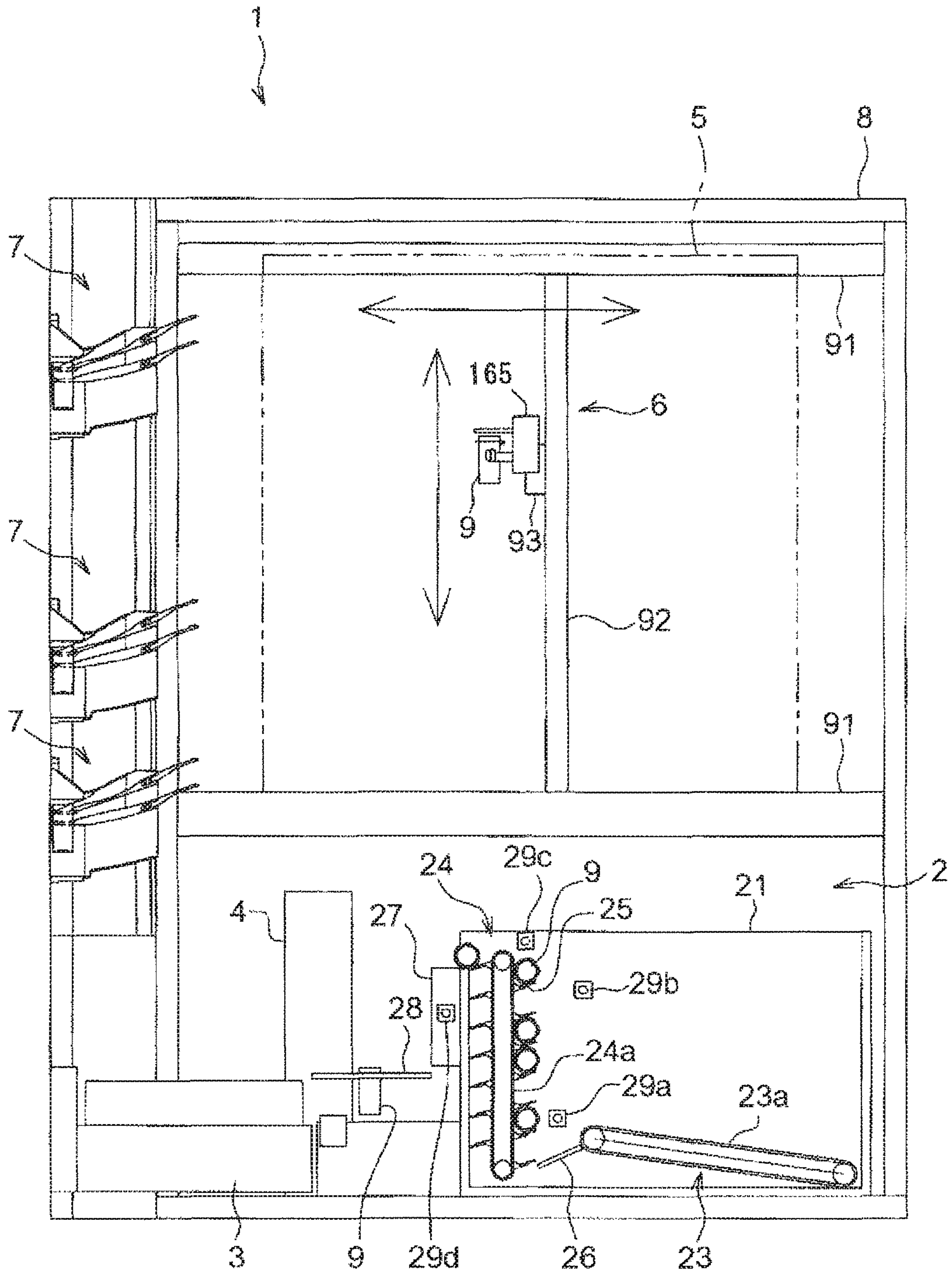
FIG. 4 is a side sectional view of the medication filling apparatus of FIG. 1.

FIGS. 1 to 4 show a medication filling apparatus 1 employing a medication cassette of the present invention. As shown in FIG. 4, the medication filling apparatus 1 has a vial bottle feeding unit 2, a labeling unit 3, a vial bottle lifter 4, a medication feeding unit 5, a conveying unit 6, discharging units 7, and a controlling unit 80 (see FIG. 27). The surface of an apparatus main body 8 of the medication filling apparatus 1 on which discharge windows 10A, 10B, and 10C for vial bottles 9 are provided is a front surface.

Figure 1:
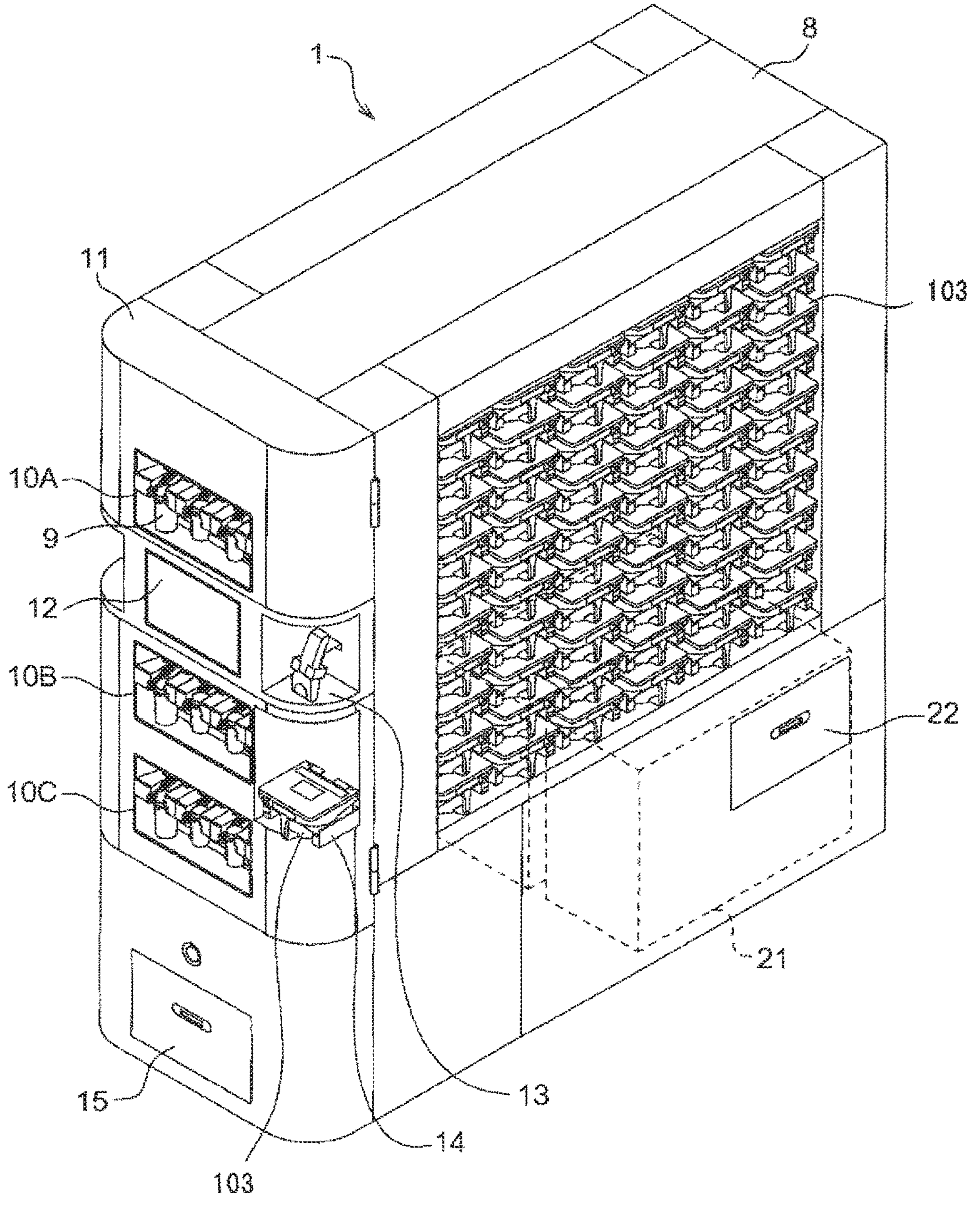
FIG. 1 is a perspective view of a medication filling apparatus according to this embodiment.
Figure 2:
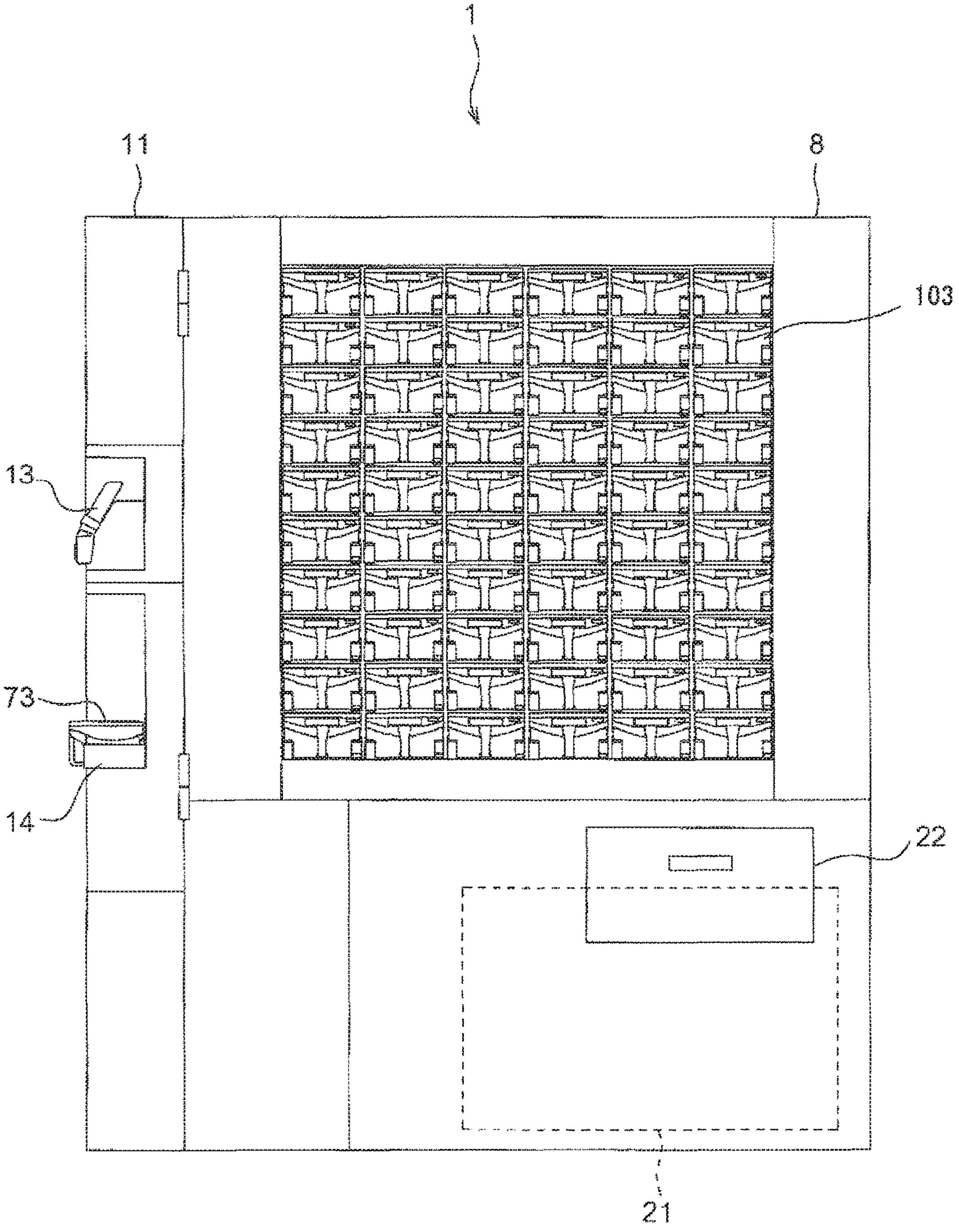
FIG. 2 is a side view of the medication filling apparatus of FIG. 1.

As shown in FIGS. 1 and 3, a front door 11 is openably and closably provided on the front surface of the apparatus main body 8. In addition to the discharge windows 10A, 10B, and 10C opened in three locations in the vertical direction, an operation panel 12 is provided between the upper discharge window 10A and the middle discharge window 10B on the front door 11. A barcode reader 13 is provided on the right side of the operation panel 12. An auxiliary mounting base 14 for a medication filling or returning operation is provided below the barcode reader 13. A drawing-out door 15 for drawing out the labeling unit 3 is provided below the lower discharge window 10C.

(1-1. The Vial Bottle Feeding Unit 2)

Figure 5:
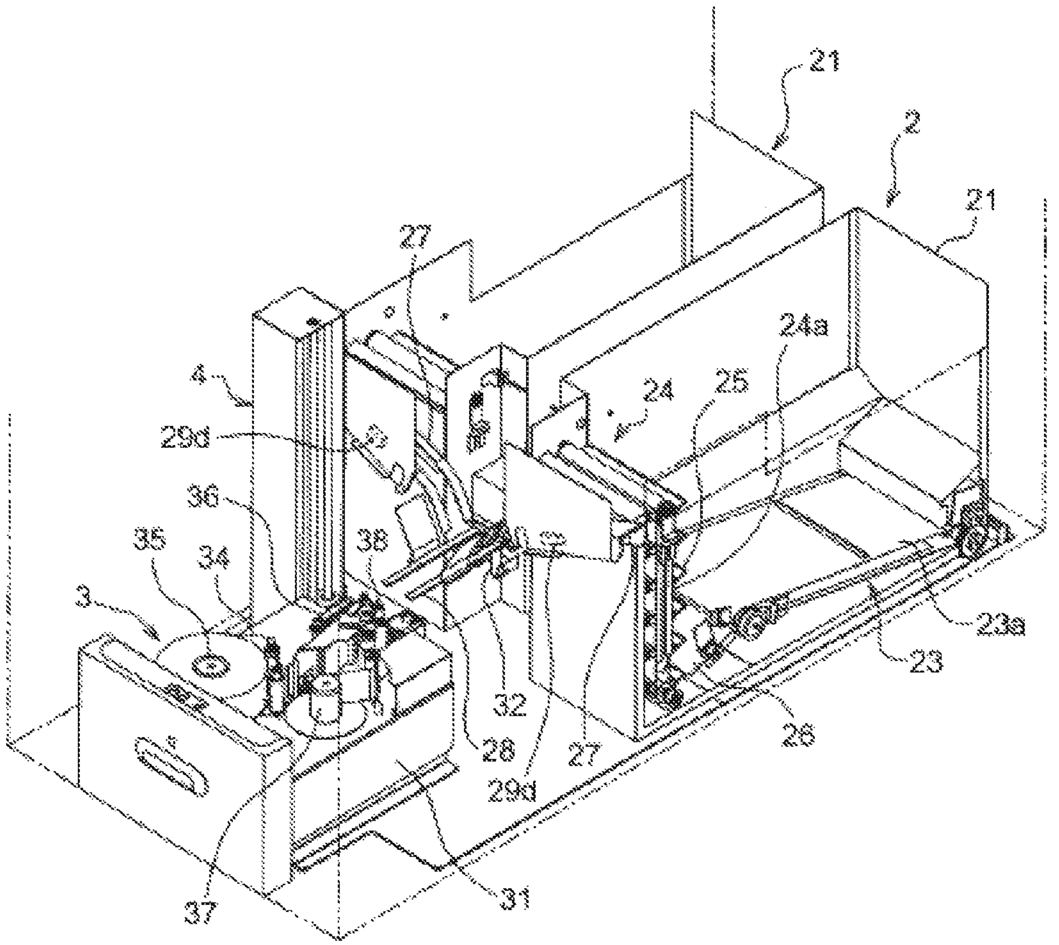
FIG. 5 is a perspective view of a vial bottle feeding unit, a labeling unit, and a vial bottle lifter.

As shown in FIG. 5, the vial bottle feeding unit 2 has stockers 21 in a rectangular box shape on both sides of the lower portion on the rear side thereof seen from the front surface of the apparatus main body 8. Each of the stockers 21 randomly accommodates the vial bottles 9 of different sizes. The vial bottles 9 can be fed by opening doors 22 (see FIG. 1) provided on the left and right side surfaces of the apparatus main body 8. A conveyor 23 having an endless belt 23*a* capable of being travelably driven and tilted upward to the front surface of the apparatus main body 8 is provided at the inner bottom of the stocker 21. The conveyor 23 conveys each of the vial bottles 9 accommodated in the stocker 21 to the front surface side. A taking-out device 24 is vertically provided along the inner wall of the stocker 21 on the front surface side. The taking-out device 24 has paddles 25 mounted at fixed intervals on an endless belt 24*a* capable of being travelably driven, and can horizontally support the vial bottle 9 on each of the paddles 25 to take out the vial bottle 9 with the raising of the endless belt 24*a*. A guide plate 26 is provided between the front end of the conveyor 23 and the lower end of the taking-out device 24, and guides the vial bottle 9 conveyed by the conveyor 23 to the paddle 25 of the taking-out device 24.

Figure 6:
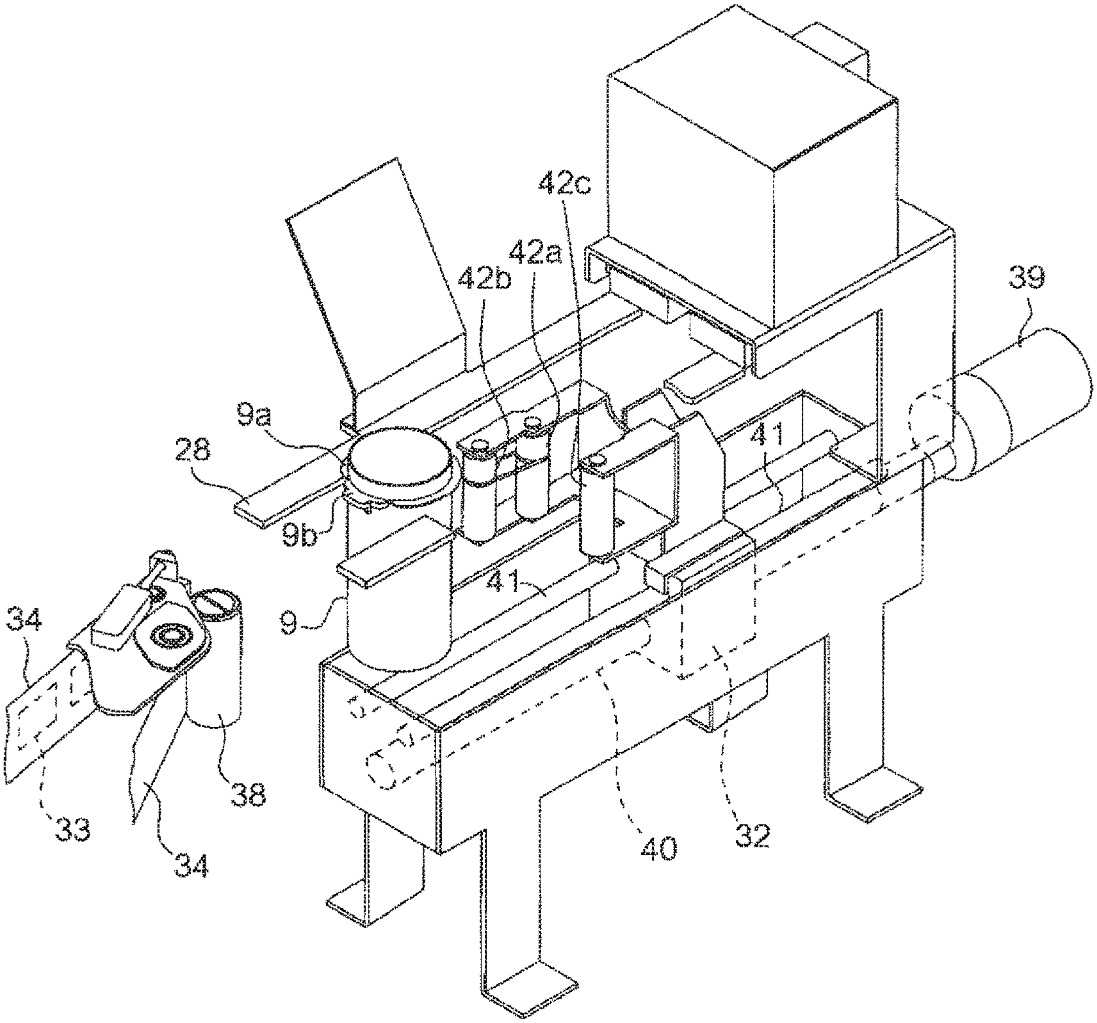
FIG. 6 is a perspective view showing a labeling operation.

On the outer wall of the stocker 21 on the front surface side, provided are a shoot 27 which slides down the vial bottle 9 taken out from the stocker 21 by the taking-out device 24 and a fork 28 which receives and supports the vial bottle 9 slid down from the shoot 27. The width of the fork 28 can be changed in the horizontal direction so that any vial bottle 9 differing in size can be supported by a well-known mechanism, such as a rack & pinion mechanism. As shown in FIG. 6, the vial bottle 9 has a flange 9*a* on the outer periphery of the mouth thereof, and a projection piece 9*b* having a mechanism of locking a cap, not shown.

As shown in FIG. 4, the vial bottle feeding unit 2 is provided with a running-out sensor 29*a* on the lower side of the inside of the stocker 21, an overfill sensor 29*b* on the upper side thereof, a prepared state detection sensor 29*c* which detects the vial bottle 9 supported by the paddle 25 in the uppermost position, and a vial bottle standby sensor 29*d* which detects the vial bottle stopped by a stopper, not shown, on the shoot 27.

(1-2. The Labeling Unit 3)

Figure 7:
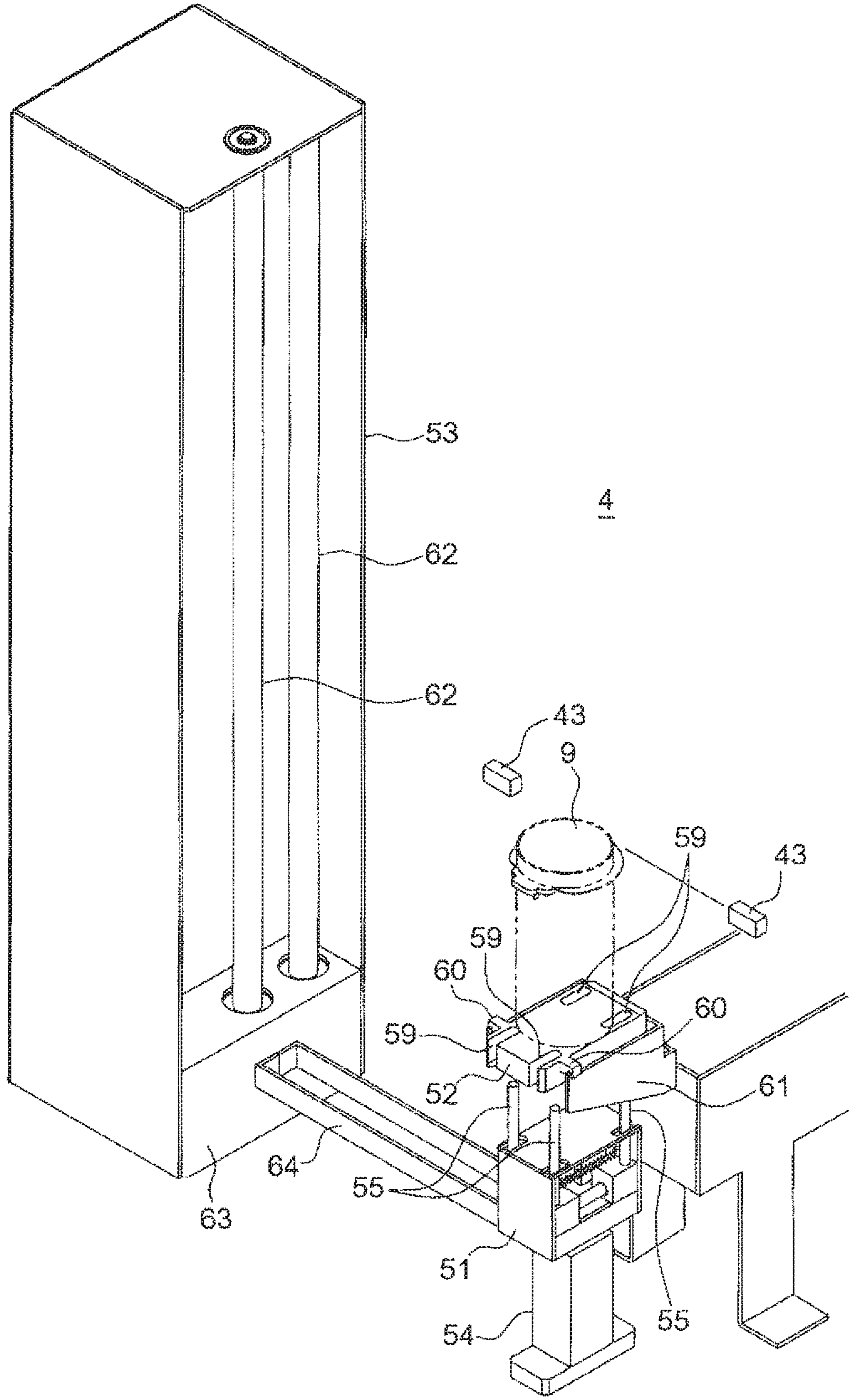
FIG. 7 is a perspective view of the vial bottle lifter showing a state where a lift is in the standby position.
Figure 8:
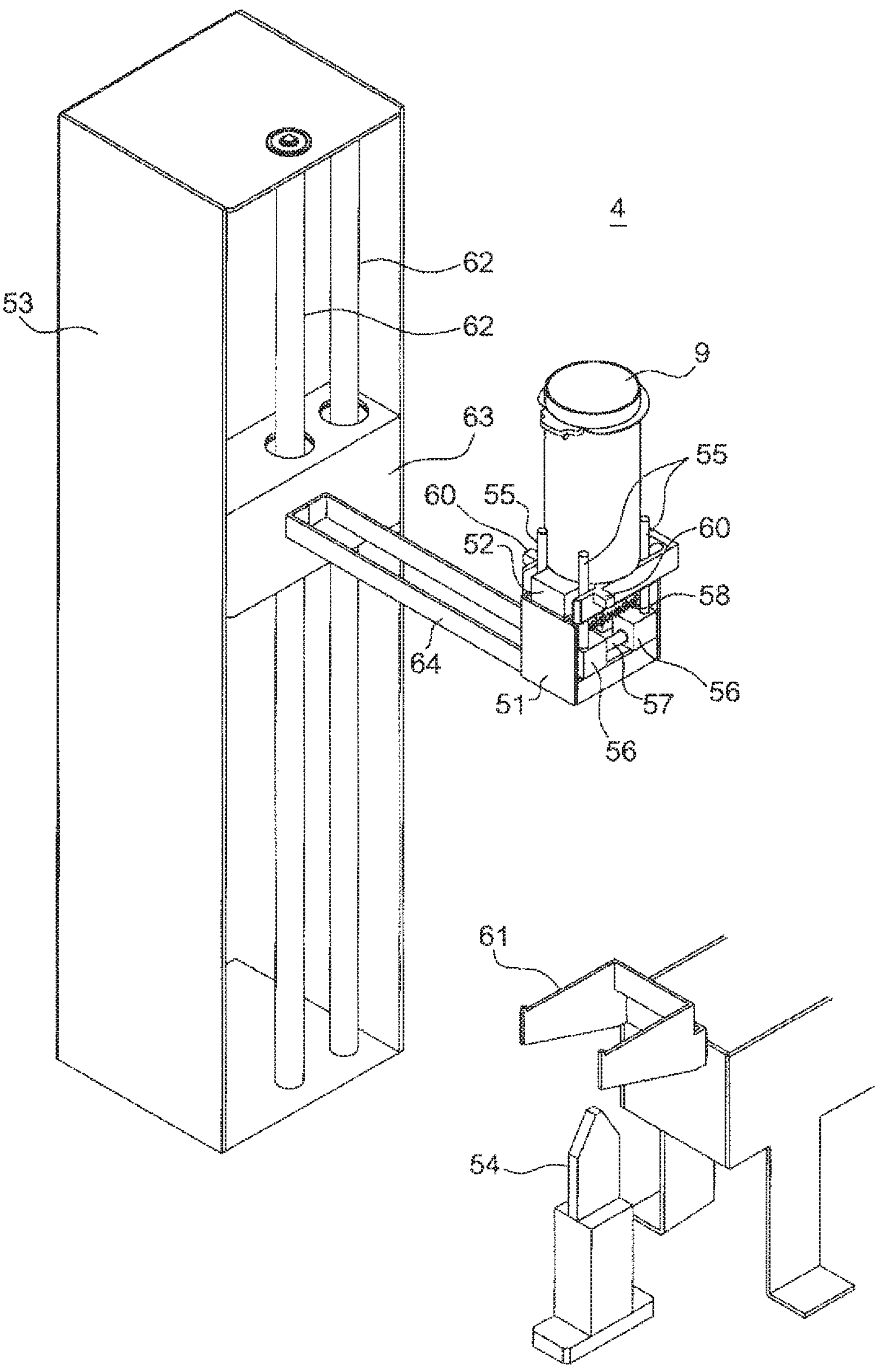
FIG. 8 is a perspective view of the vial bottle lifter showing a state where the lift is being lifted.

As shown in FIG. 5, the labeling unit 3 has a label printer 31, and a pusher 32. As shown in FIG. 6, the label printer 31 uses a label tape 34 onto which labels 33 stuck onto the outer peripheral surface of the vial bottle 9 are stuck at fixed intervals. The label printer 31 which has been well-known has a tape reel 35 winding the label tape 34, a print head 36 which prints information, such as a prescription number, a patient's name, and a medication name, on each of the labels 33 on the label tape 34 fed from the tape reel 35, a winding reel 37 which winds the label tape 34 from which the label 33 is separated, and a driving roller 38 which rotates the vial bottle 9. As shown in FIG. 6, the pusher 32 can be moved along guide rods 41 in parallel with the fork 28 by a ball screw 40 driven by a motor 39. The pusher 32 has three rollers 42*a*, 42*b*, and 42*c* which push the vial bottle 9 supported by the fork 28 of the vial bottle feeding unit 2 onto the driving roller 38 of the label printer 31. As shown in FIG. 7, the apparatus main body 8 is provided with a sensor 43 which detects the position of the projection piece 9*b* of the small or large vial bottle 9.

(1-3. The Vial Bottle Lifter 4)

As shown in FIGS. 7 to 9B, the vial bottle lifter 4 has a lift 51 on which the vial bottle 9 is placed, a support plate 52 placed on the lift 51, a lift mechanism 53 which lifts and lowers the lift 51 and the support plate 52, and a pin opening/closing rod 54.

Four pins 55 are projected from the upper surface of the lift 51, and support the outer periphery of the vial bottle 9. The bases of the two opposite pins 55 are fixed to movable blocks 56. The two movable blocks 56 can be moved along a guide rod 57 in the contacting and separating directions, and are biased by a spring 58 in the contacting direction. Long cutaways 59 into which the four pins 55 enter are formed in the support plate 52. The support plate 52 has plural ears 60 on the outer periphery thereof, and is placed on a bracket 61 fixed to the apparatus main body 8 by the ears 60. The lift mechanism 53 has a lift block 63 which is lifted and lowered along guide rods 62 by a belt driving device, not shown. The lift 51 is fixed to the distal end of an arm 64 provided on the lift block 63. The pin opening/closing rod 54 is located below the lift 51, and is fixed to the apparatus main body 8. The pin opening/closing rod 54 is engaged and disengaged between the two movable blocks 56 in the lift 51 with the lifting/lowering operation of the lift 51, and moves the movable blocks 56 to open and close the four pins 55.

Figure 9A:
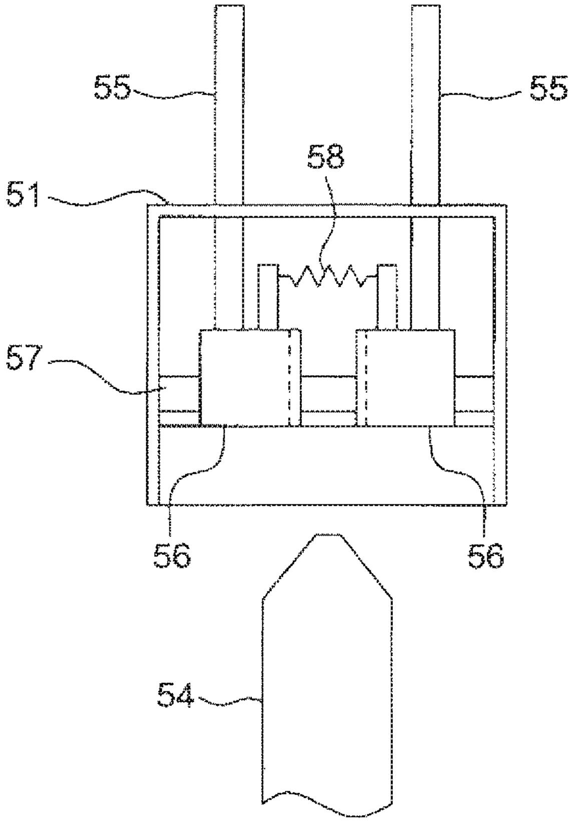
FIGS. 9A and 9B are side views showing the operation of movable blocks for pins and a pin opening/closing rod.
Figure 9B:
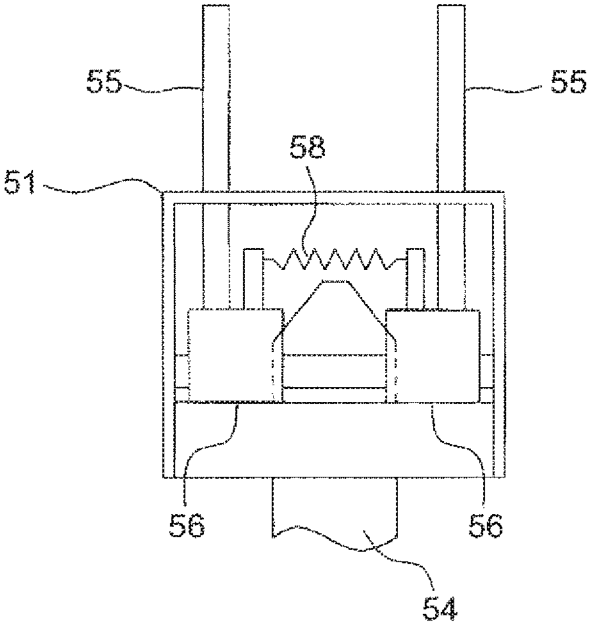

When the lift 51 is lowered by the driving of the lift mechanism 53 of the vial bottle lifter 4, as shown in FIG. 9A, the four pins 55 are pushably widened by the pin opening/closing rod 54 provided below the lift 51 and are then moved in the direction separated from the vial bottle 9 against the biasing force of the spring 58. The support plate 52 is supported and stopped by the bracket 61 during the lowering of the lift 51, but the lift 51 continues to be lowered and is then stopped in the lowermost position. When the lift 51 is lifted from the lowermost position, as shown in FIG. 9B, while the support plate 52 supported by the bracket 61 is placed, the four pins 55 are released from the pin opening/closing rod 54 and then pressingly hold the vial bottle 9 on the support plate 52 by the biasing force of the spring 58. The lift mechanism 53 conveys the vial bottle 9 placed on the lift 51 from the labeled position to the transferred position in the conveying unit 6 described later.

(1-4. The Medication Feeding Unit 5)

Figure 10:
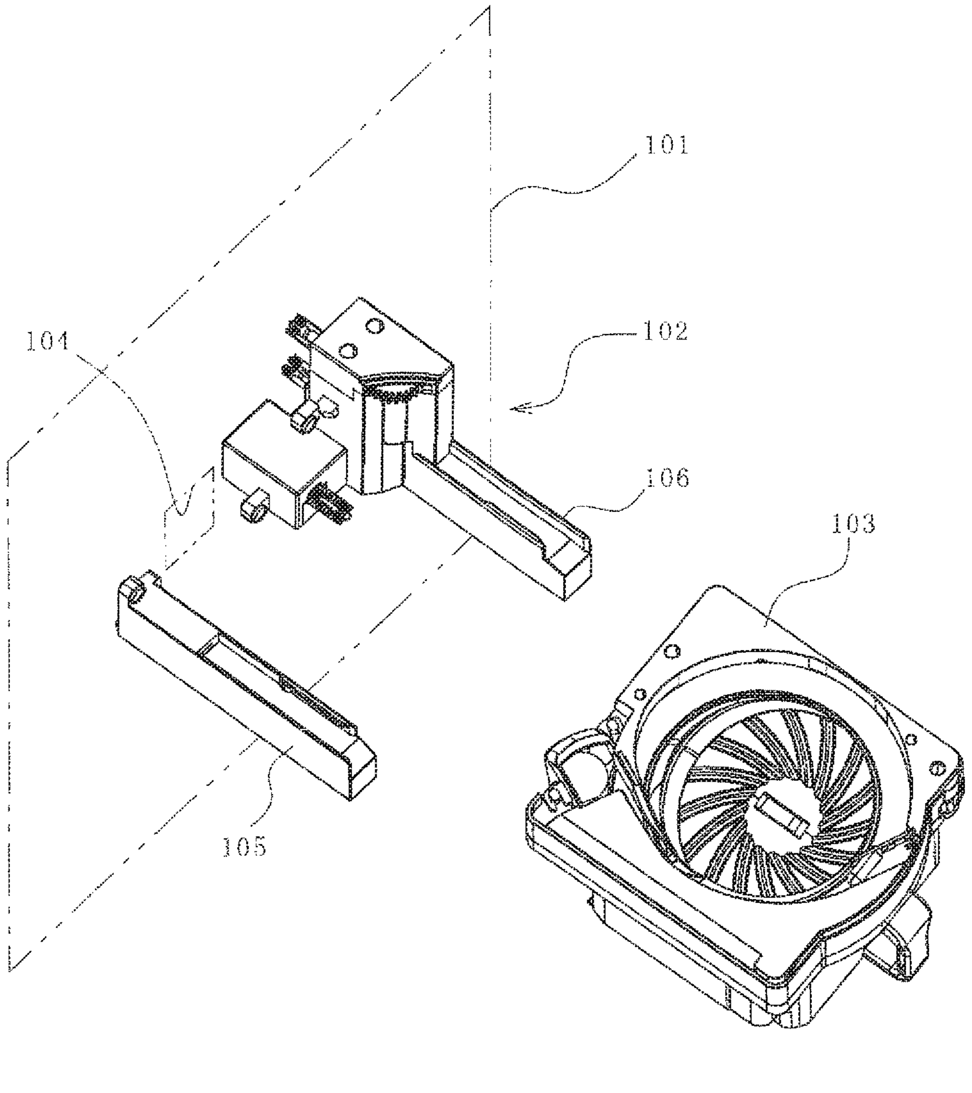
FIG. 10 is a perspective view showing a state where a medication cassette is removed from a cassette mounting portion.

As shown in FIG. 10, in the medication feeding unit 5, plural cassette mounting portions 102 (in FIG. 10, only one is shown) are formed on a support panel 101 on either side of the apparatus main body 8, and a medication cassette 103 can be removably mounted on each of the cassette mounting portions 102.

(1-4-1. The Cassette Mounting Portions 102)

The cassette mounting portions 102 are arranged on the support panel 101 in a matrix in the vertical and horizontal directions, where medication outlets 104 are formed. In addition, each of the cassette mounting portions 102 has a first guide rail 105 and a second guide rail 106 located on the outer surface of the support panel 101 and extended in the direction of the normal to the support panel 101.

Figure 11A:
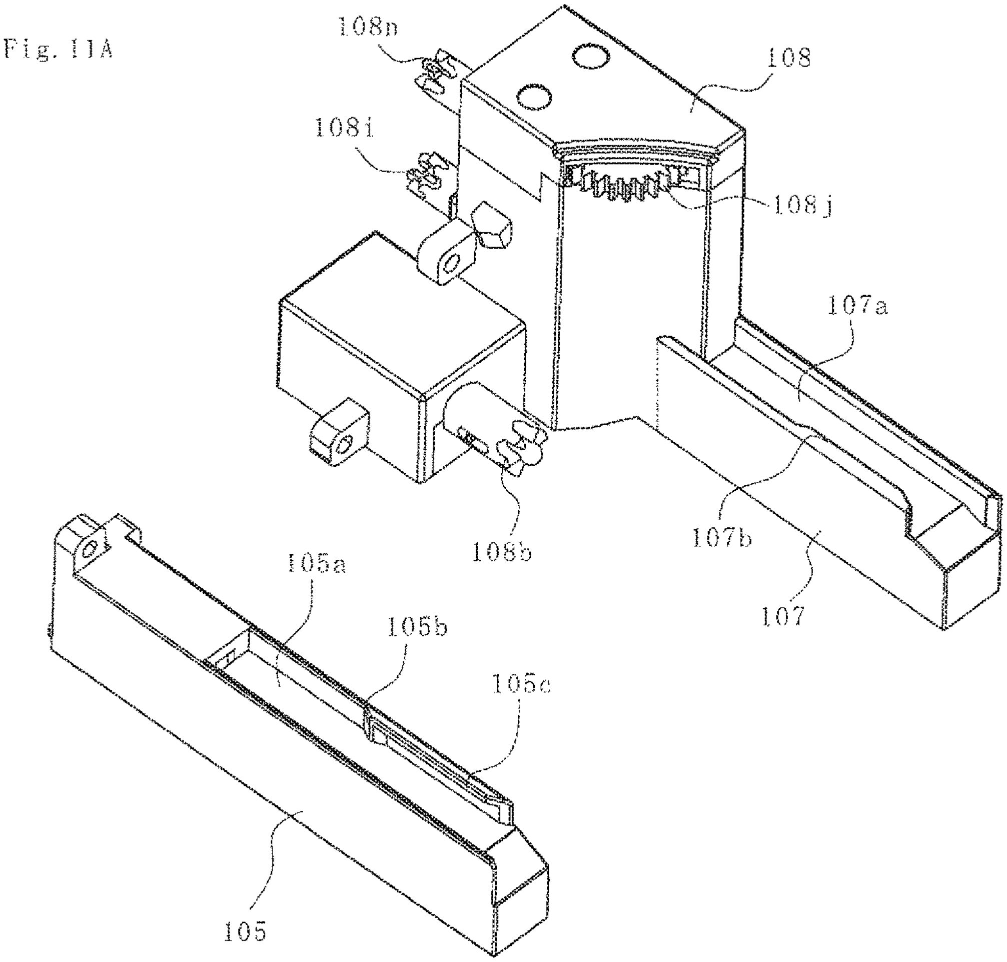
FIG. 11A is an enlarged perspective view of the cassette mounting portion of FIG. 10.

As shown in FIG. 11A, the first guide rail 105 has, on the upper surface thereof, a groove 105*a* which guides the lower end of a side wall 120*a* formed on a main body 114 configuring part of a cassette main body 109 of the medication cassette 103. One side surface of the groove 105*a* is flat. An engagement receiving portion 105*b* is formed on the other side surface of the groove 105*a* from the front end thereof to the rear side thereof by a predetermined dimension. The upper edge portion of the groove 105*a* from the front end thereof to the engagement receiving portion 105*b* is a guide edge 105*c* projected to the opposite surface side.

The second guide rail 106 has a rail 107, and an accommodating portion 108 joined thereto.

Like the first guide rail 105, the rail 107 has a groove 107*a* having a guide edge 107*b* on the upper surface thereof, where an engagement receiving portion (not shown) is formed.

Figure 11B:
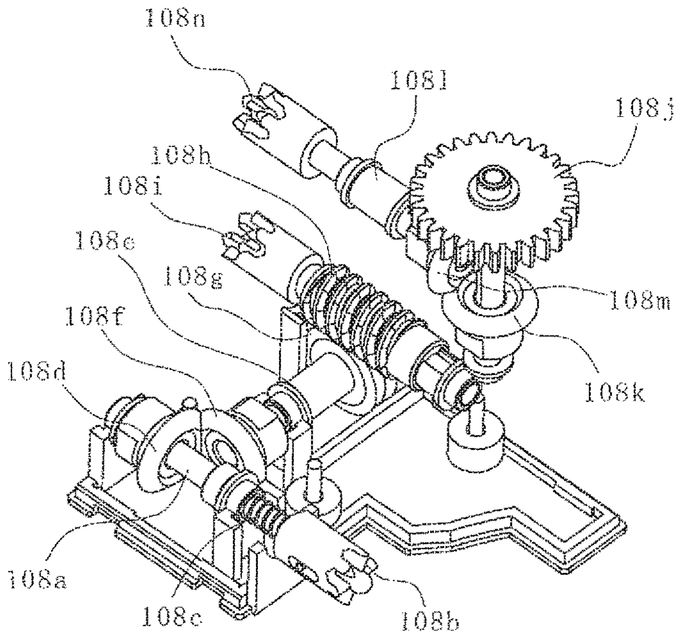
FIG. 11B is a perspective view showing the inner configuration of a second guide rail of FIG. 11A.

As shown in FIG. 11B, a driving gear 108*b* integrated with one end of a shaft 108*a* is projected from the accommodating portion 108. The driving gear 108*b* can be pushed into the accommodating portion 108 by being biased by a spring 108*c*, and is engaged with a driven gear 159*a* provided in a raising/lowering mechanism 153 of the medication cassette 103 described later.

The accommodating portion 108 accommodates a bevel gear 108*f* of an intermediate gear member 108*e* engaged with a bevel gear 108*d* provided midway the shaft 108*a*, and a worm gear 108*h* engaged with a pinion gear 108*g* of the intermediate gear member 108*e*. A driven gear 108*i* having the same configuration as the driving gear 108*b* is integrated with the end of the rotational shaft of the worm gear 108*h*, where a driving gear 174*a* provided at the end of the rotational shaft of a first driving motor 174 described later can be engaged therewith. With this, when the first driving motor 174 is driven, power is transmitted to the driving gear

108*b* via the worm gear 108*h* and the intermediate gear member 108*e*, so that the raising/lowering mechanism 153 of the medication cassette 103 is driven. With the worm gear 108*h* being interposed, the driving gear 108*b* is not rotated freely even when the power from the first driving motor 174 is blocked.

Further, a driving gear 108*j* is accommodated in the accommodating portion 108 in a state where part of it is exposed, and is engaged with a driven gear 112*b* of a second rotating body 112. A bevel gear 108*k* is fixed to the rotational shaft of the driving gear 108*j*, where a bevel gear 108*m* provided on a driven gear member 108*l* is engaged therewith. In the same manner as above, a driven gear 108*n* is integrated with the end of the driven gear member 108*l*, so that a second driving gear 175*a* provided at the end of the rotational shaft of a second driving motor 175 described later can be engaged therewith. With this, when the second driving motor 175 is driven, power is transmitted via the driven gear 108*n* and the driving gear 108*j* to rotate the second rotating body 112.

(1-4-2. The Medication Cassette 103)

Figure 12:
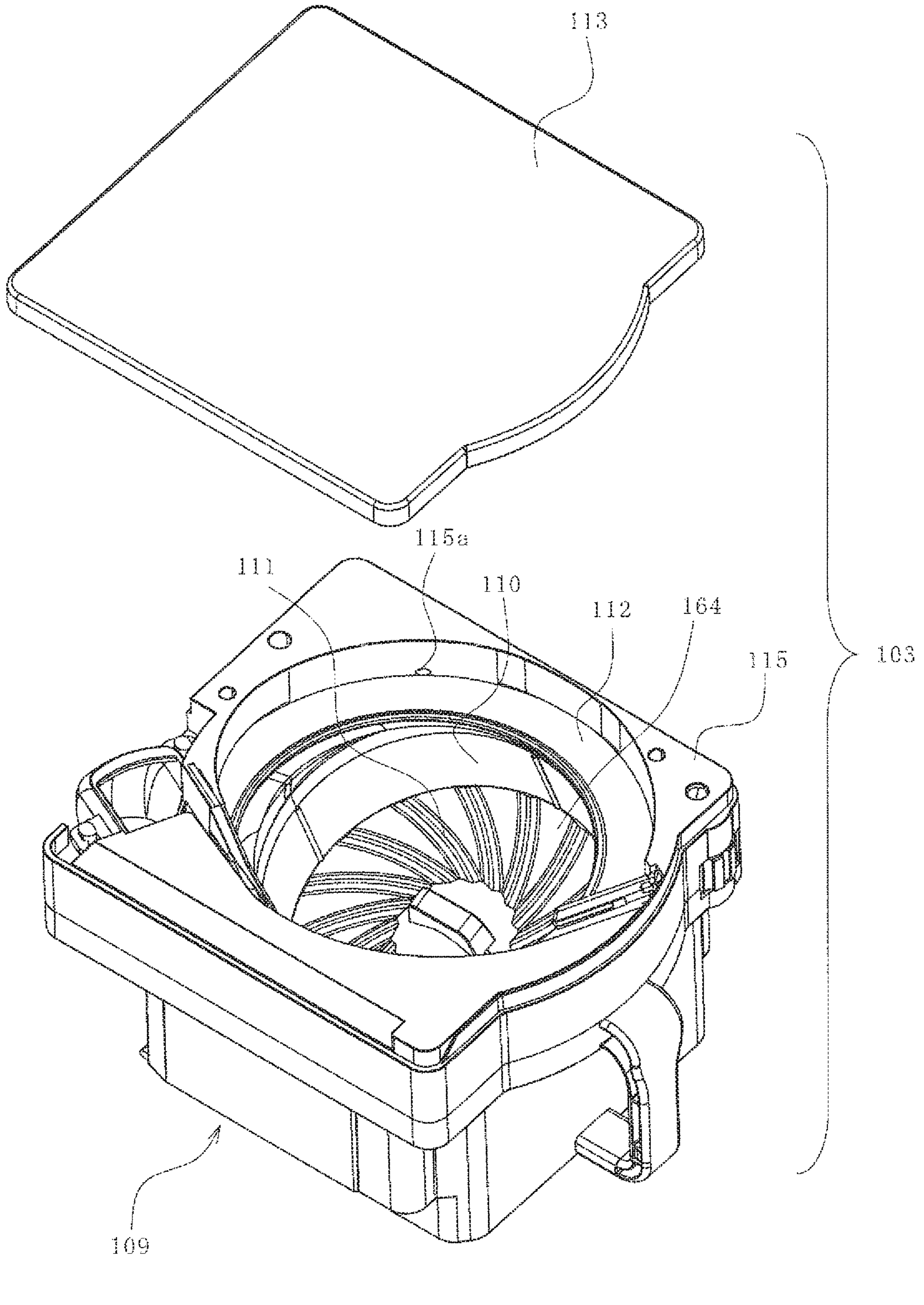
FIG. 12 is a perspective view showing a state where a lid body is removed from the medication cassette of FIG. 10.

As shown in FIG. 12, the medication cassette 103 accommodates a cylindrical body 110 in the cassette main body 109, accommodates a first rotating body 111 in the cylindrical body 110, and arranges the second rotating body 112 on the outer circumference of the upper end opening of the cylindrical body 110, so that the upper opening of the cassette main body 109 is closed by a lid body 113. The direction of the rotation shaft center of the first rotating body 111 coincides with the direction of the shaft center of the cylindrical body 110.

Figure 13:
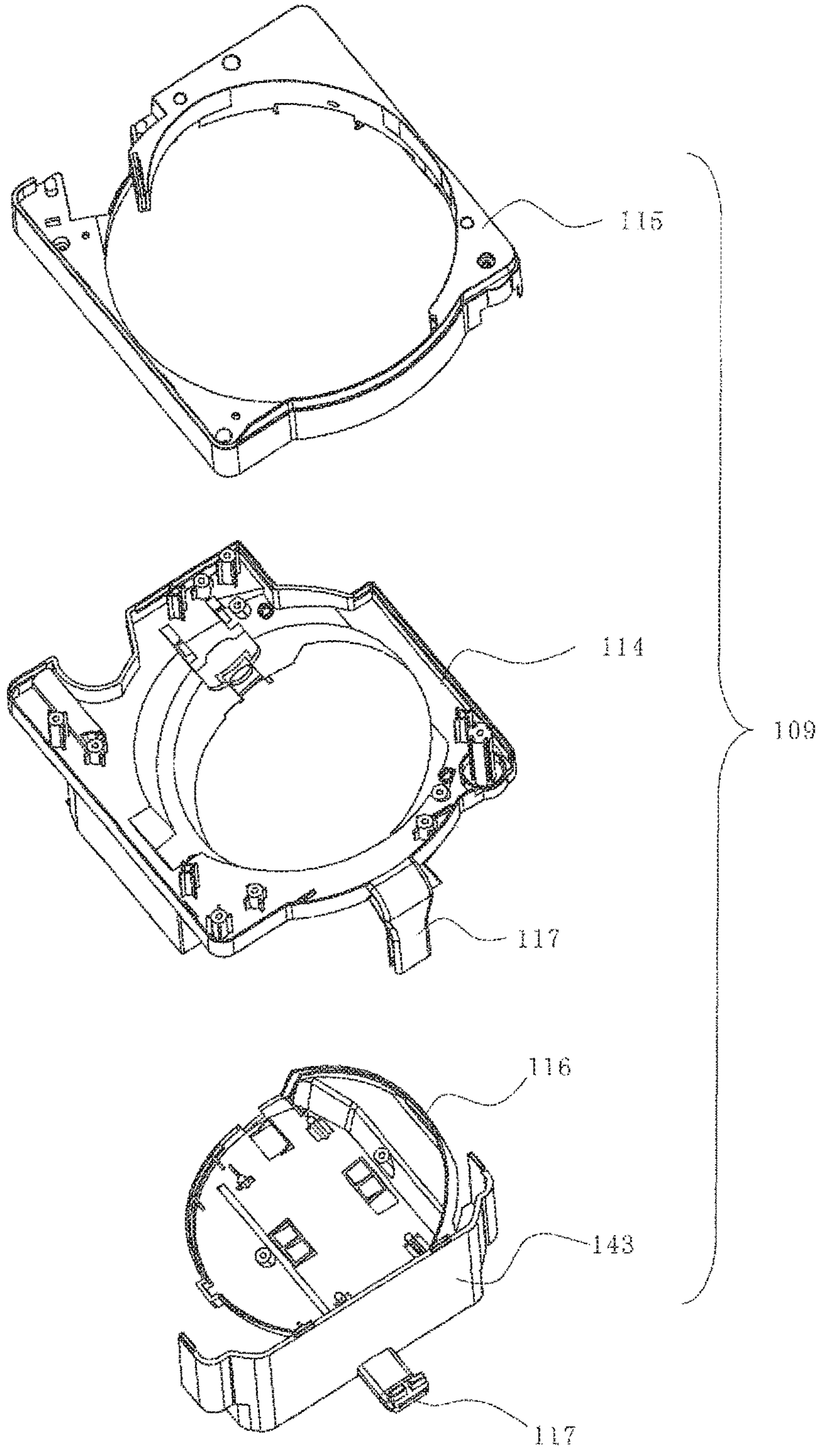
FIG. 13 is an exploded perspective view of a cassette main body of the medication cassette shown in FIG. 12.

As shown in FIG. 13, in the cassette main body 109, a cover 115 is fixed to the upper side of the main body 114, and a base 116 is fixed to the lower side of the main body 114.

The main body 114 is substantially cylindrical, so that a knob 117 (except for the lower end portion thereof) is formed at the center of the front surface thereof.

Figure 14:
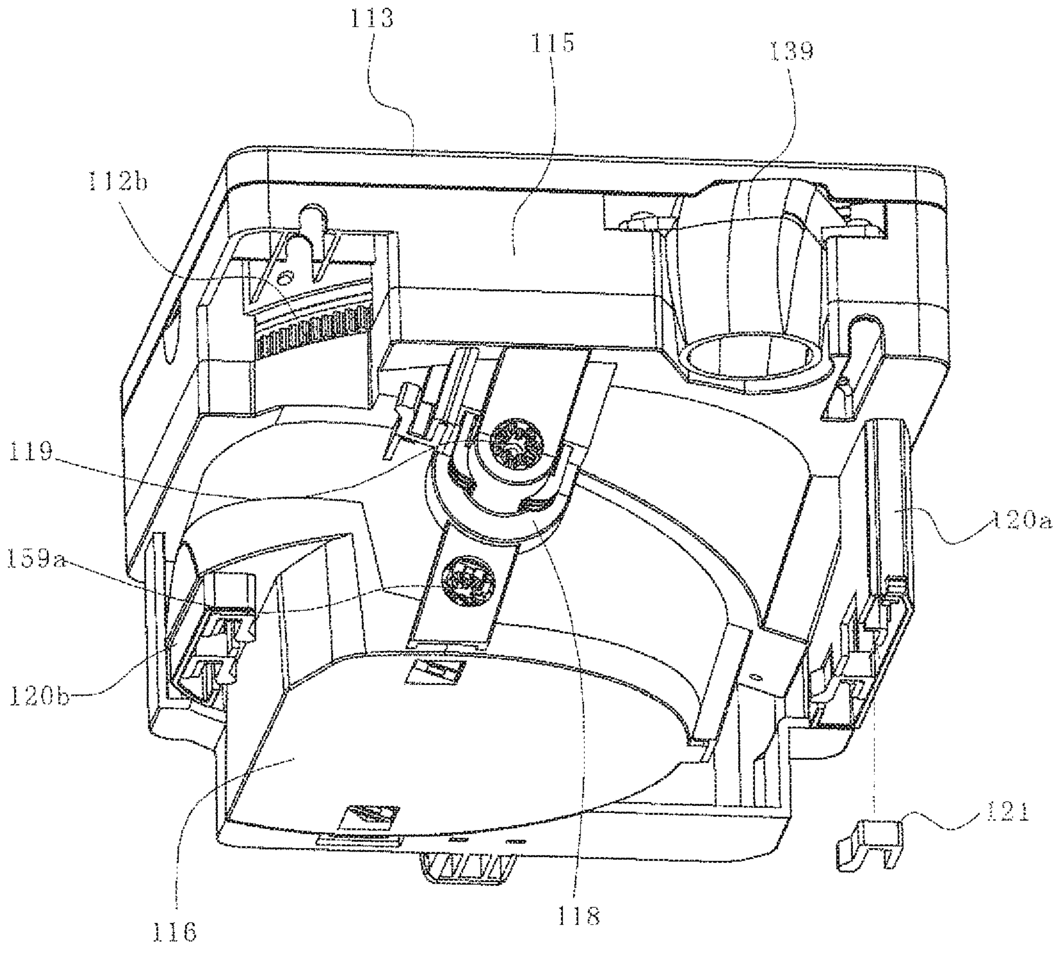
FIG. 14 is a perspective view showing a state where the medication cassette of FIG. 10 is seen from the lower side thereof.

As shown in FIG. 14, a bearing 118 is provided on the rear surface of the main body 114, where a gear member 119 is rotatably held. In addition, a through-hole is formed on the lower side of the bearing 118, where the driven gear 159*a* provided at one end of a screw shaft 159 described later is exposed.

Figure 15:
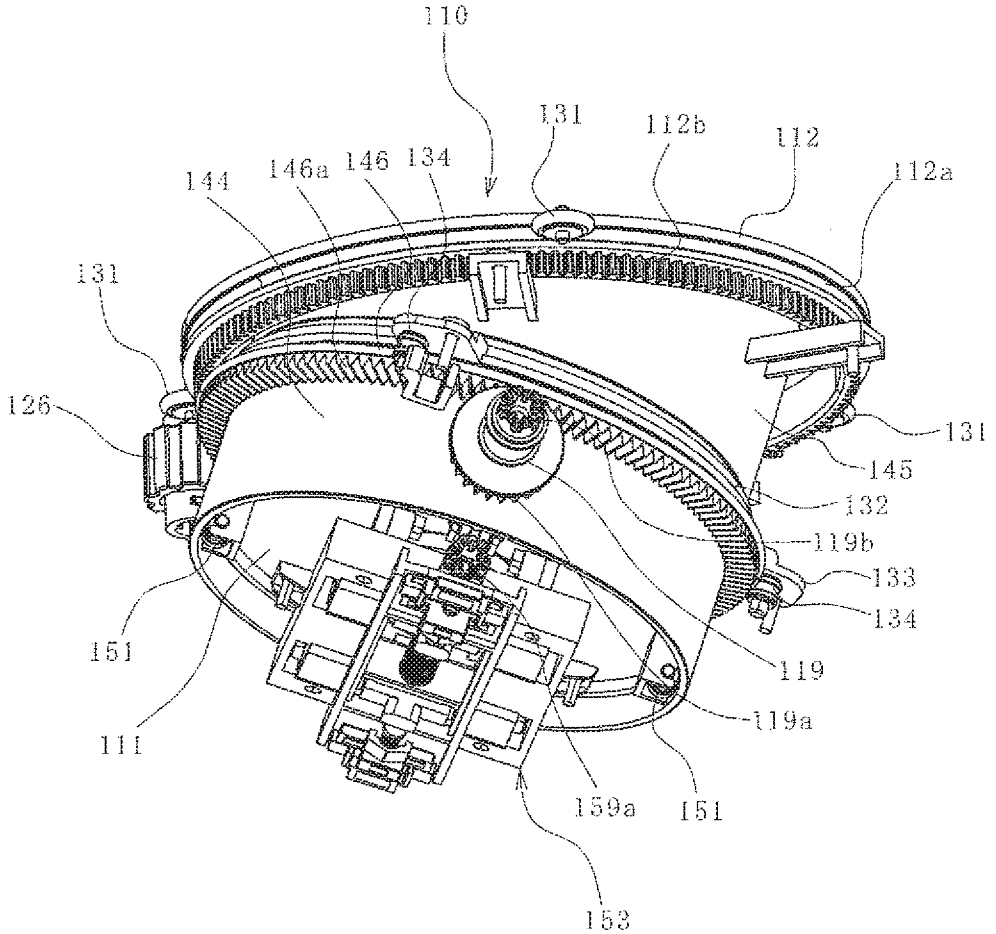
FIG. 15 is a perspective view showing a state where a main body and a base of the cassette main body are removed from FIG. 14.

As shown in FIG. 15, the gear member 119 has a first gear 119*a* having a gear formed on the outer circumferential surface thereof, and a second gear 119*b* having a gear formed at the end of the shaft extended from the center of the first gear 119*a*. The first gear 119*a* is engaged with a driven gear 146*a* of a first cylindrical portion 144, and the second gear 119*b* is engaged with the driving gear 108*b* of the cassette mounting portion 102.

As shown in FIG. 14, the side wall 120*a* and a side wall 120*b* separated from the cylindrical portion are formed on both sides of the main body 114. Two engagement pieces 121 are mounted on each of the side walls 120*a* and 120*b*. Each of the engagement pieces 121 has substantially C-shaped cross section, so that part of it is exposed from the inner side surface of each of the side walls 120*a* and 120*b*. The exposed portion of the engagement piece 121 is projected inward, and is pushed outward to be resiliently deformed. With this, when the side walls 120*a* and 120*b* are slid in the grooves 105*a* and 107*a* of the first guide rail 105 and the second guide rail 106 of the cassette mounting portion 102, respectively, they are guided by the guide edges 105*c* and 107*b*, so that one side of the engagement piece 121 is passed over the engagement receiving portion 105*b* (the second guide rail 106 side is not shown) to recover the shape, whereby the medication cassette 103 is mounted on the cassette mounting portion 102.

Figure 17A:
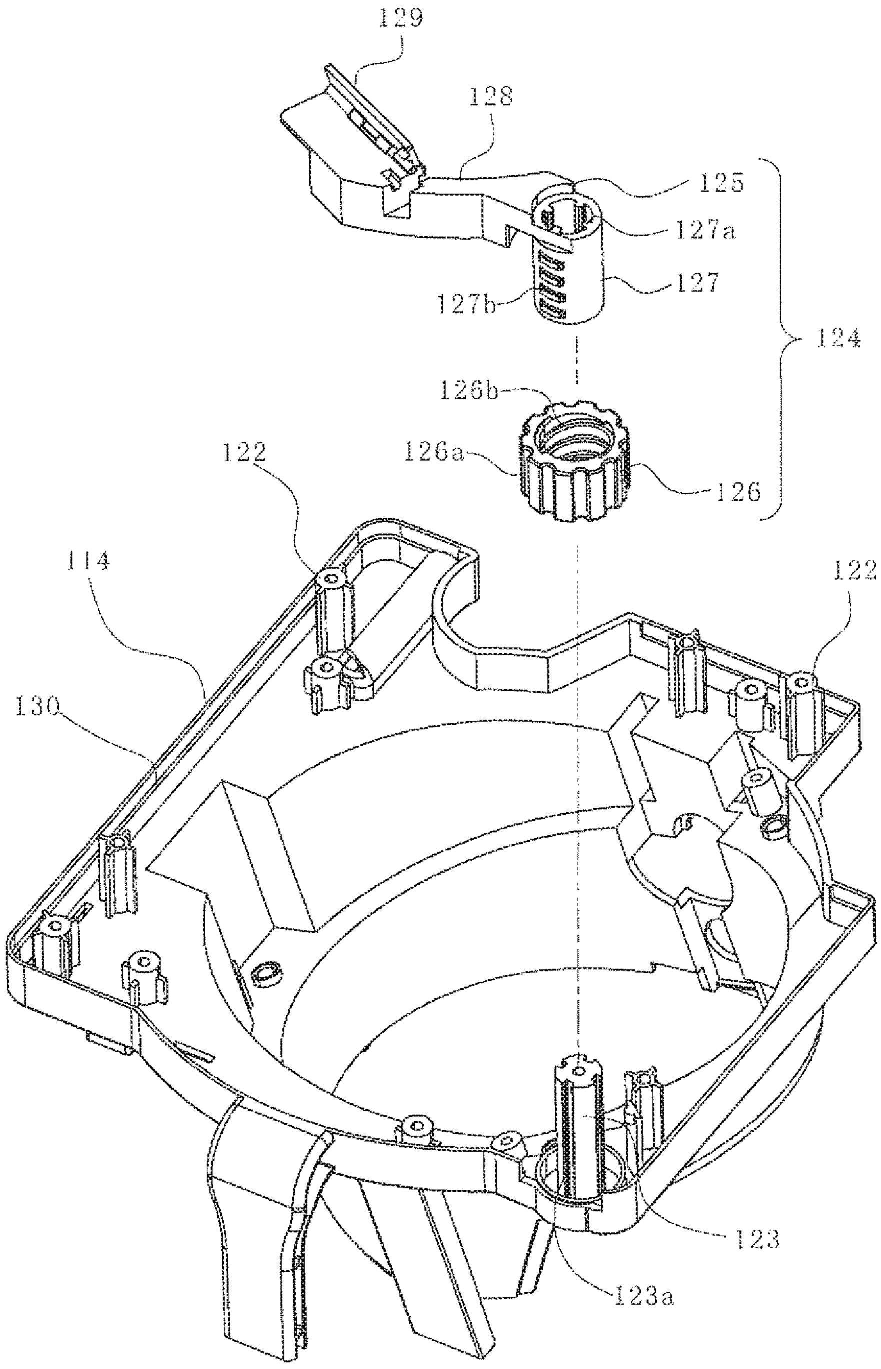
FIG. 17A is an exploded perspective view of the main body of FIG. 12 and a height regulation member mounted thereon.

As shown in FIG. 17A, female screws 122 for screwing the cover 115 are formed at four corners on the upper surface of the main body 114. In addition, a holding shaft 123 for holding a cylindrical portion 127 of a height regulation member 124 is projected from one of the four corners. Plural (here, four) grooves 123*a* extended in the upward and downward direction are formed on the outer circumferential surface of the holding shaft 123 to be located in positions equally divided in the circumferential direction thereof.

Figure 17B:
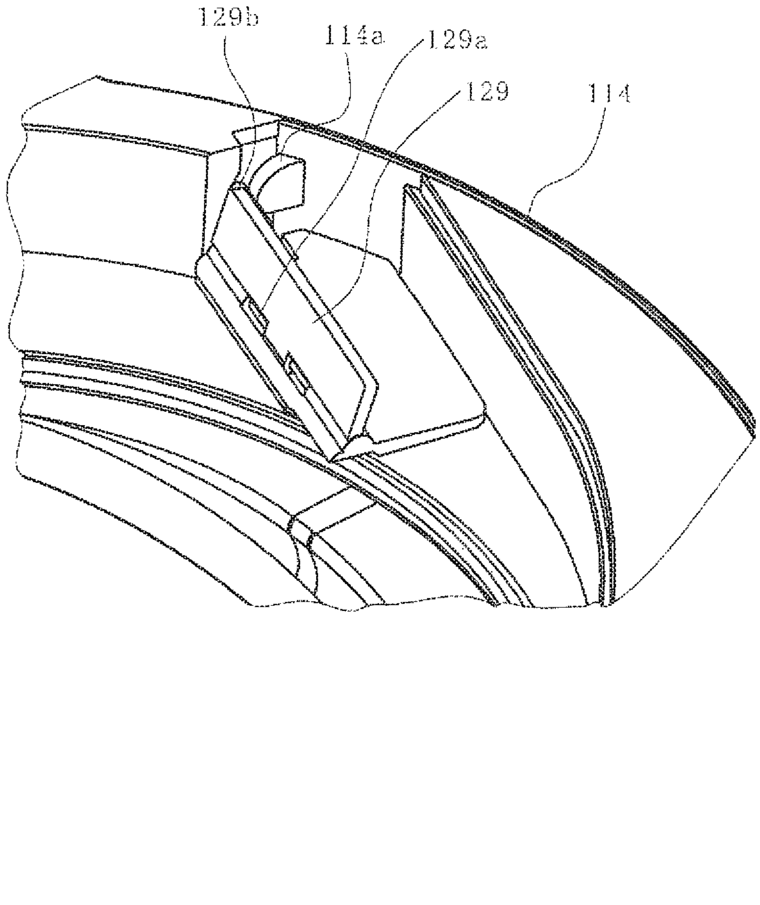
FIG. 17B is an enlarged perspective view showing the vicinity portion of a regulation piece of FIG. 17A.

The height regulation member 124 has a guide piece 125 and a dial 126. The guide piece 125 has the cylindrical portion 127 fitted onto the holding shaft 123, and a regulation piece 128 which is extended from the cylindrical portion 127 and regulates the height of medications conveyed on the second rotating body 112. Plural ridges 127*a* coinciding with the grooves of the holding shaft 123 are formed on the inner circumferential surface of the cylindrical portion 127, so that the cylindrical portion 127 can be raised and lowered, but is unrotatably supported by the holding shaft 123. Plural projections 127*b* are formed on the outer circumferential surface of the cylindrical portion 127 at predetermined intervals in the upward and downward direction (in FIG. 17A, only four projections 127*b* are shown, and other four projections 127*b* are formed on the rear surface side). The regulation piece 128 is extended inward from the cylindrical portion 127 along the outer circumferential edge of the second rotating body 112. The inward-extended portion has a lower surface formed in parallel with the upper surface of the second rotating body 112, and an upper surface on which an auxiliary piece 129 is mounted to be rotatable about a support shaft 129*a*. As shown in FIG. 17B, a guide shaft 129*b* projected sidewise is formed on one end side of the auxiliary piece 129. The guide shaft 129*b* is moved along a guide wall 114*a* of the cover 115. With this, when the guide piece 125 is moved upward, the auxiliary piece 129 is rotated about the support shaft 129*a* so that the erection angle thereof is small. The dial 126 is prevented from being slipped when rotationally operated with fingers in plural vertical grooves 126*a* formed on the outer circumferential surface thereof. In addition, the dial 126 has a helical groove 126*b* formed on the inner circumferential surface thereof, so that the dial 126 is rotated to change the position engaged with each of the projections 127*b* in the upward and downward direction of the cylindrical portion 127, thereby raising and lowering the guide piece 125. In this way, the guide piece 125 has the rotatable auxiliary piece 129 in the upper portion thereof. For this, in a state where the guide piece 125 is lowered according to medication size, the auxiliary piece 129 is erected to prevent a gap from being caused between it and the lid body 113, while in a state where the guide piece 125 is raised, the auxiliary piece 129 is abutted onto the lid body 113 to be folded to the regulation piece 128 side. Therefore, a gap according to medication size can be formed between the guide piece 125 and the second rotating body 112 without increasing the size of the medication cassette 103 in the up direction.

Figure 16:
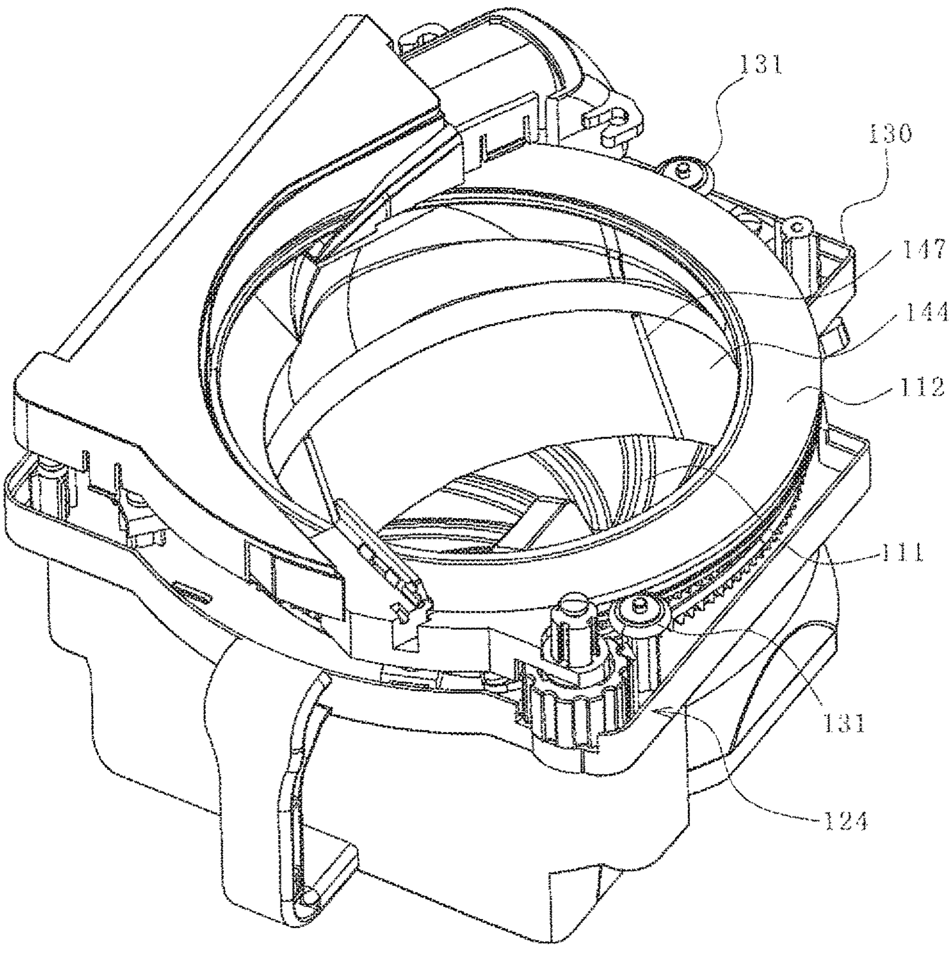
FIG. 16 is a perspective view showing a state where a cover of the cassette main body is removed from the medication cassette of FIG. 12 and a first rotating body is moved to the lowermost position.

The upper surface of the main body 114 is surrounded by a peripheral wall 130, and as shown in FIG. 16, first guide rollers 131 (one of them is not shown) are rotatably arranged in three positions substantially equally divided on the inside thereof. The first guide rollers 131 are abutted onto the outer circumferential surface of the second rotating body 112 described later, and rotatably support the second rotating body 112. As shown in FIG. 15, a ring member 132 is located on the upper surface of the first cylindrical portion 144. Second tongue pieces 133 are located in three positions substantially equally divided in the circumferential direction of the ring member 132, and are extended in the outside diameter direction. Each of the second tongue pieces 133 is screwed to the main body 114, so that each of second guide rollers 134 is mounted thereon. The second guide roller 134 has a groove-shaped portion which is formed of two ridges formed on the outer peripheral surface thereof and projected from the lower side of the second tongue piece 133. The groove-shaped portion of the second guide roller 134 guides the outer circumferential surface of an annular collar 146 of the first cylindrical portion 144. That is, the ring member 132 rotatably holds the first cylindrical portion 144.

Figure 18:
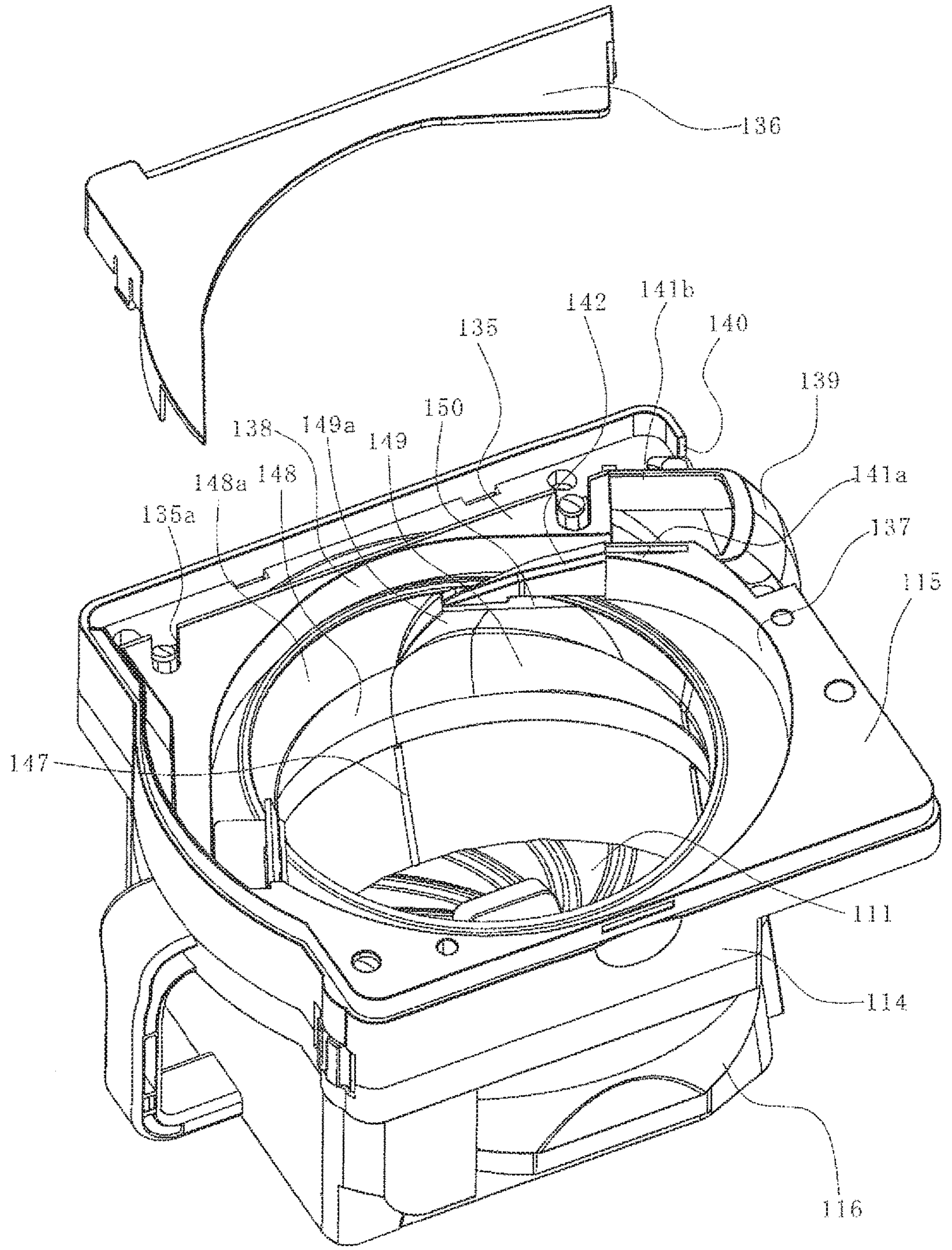
FIG. 18 is an exploded perspective view showing a state where a cover body is separated from the medication cassette of FIG. 12.

As shown in FIG. 18, the cover 115 has a guide member 135, and a cover body 136 covering the upper side thereof. The cover 115 has a portion having a first guide surface 137 exceeding half of the circular cylindrical surface thereof. The outer circumferential edge of the second rotating body 112 described later is located along the first guide surface 137. The guide member 135 has a portion having a second guide surface 138 configuring the circular cylindrical surface by it and the first guide surface 137. Two long grooves 135*a* are formed in the guide member 135, whereby the guide member 135 is mounted so that the position thereof can be adjusted with respect to the main body 114 by using the long grooves 135*a*. The guide member 135 is mounted so that the inner surface thereof is gradually projected to the center side from the same circumferential surface where the first guide surface 137 is located. With this, the medication size (width dimension) which can be conveyed by the second rotating body 112 is limited by the guide member 135, so that only one medication can be passed.

A discharging portion 139 is provided on the other end side (the downstream side in the medication conveying direction) of the guide member 135. The discharging portion 139 is formed to be of substantially rectangular cylindrical cross section. A cutaway portion 140 which can receive the medications conveyed by the second rotating body 112 is formed in the upper portion of the discharging portion 139. A discharge guide piece 142 is mounted on the end portion of one side wall (a first side wall 141*a*). The end of the other side wall (a second side wall 141*b*) is abutted onto the end surface of the guide member 135. The discharge guide piece 142 has a mounting portion fitted to the first side wall 141*a* formed to be of rectangular cylindrical cross section, and a guide projected along the first side wall 141*a*. An inclined surface is formed at the end of the guide so as to increase the distance between it and the inner surface of the guide member 135 toward the end thereof and to be decreased in height. The discharge guide piece 142 which has the guide having such an inclined surface can smoothly guide the medications conveyed by the second rotating body 112 to the discharging portion 139.

Further, a through-hole 115*a* (see FIG. 12) is formed in the side surface of the cover 115, so that through the through-hole 115*a*, the medications conveyed on the second rotating body 112 can be detected by a second medication detection sensor 179 described later.

A front cover 143 (see FIG. 13) integrated with the lower end of the knob 117 is mounted on the front surface side of the base 116.

As shown in FIG. 15, the cylindrical body 110 has the first cylindrical portion 144 which can be rotated about the shaft center thereof, and a second cylindrical portion 145 which is arranged thereabove and cannot be rotated about the shaft center thereof.

The annular collar 146 is formed on the outer circumferential surface on the upper side of the first cylindrical portion 144. The driven gear 146*a* is formed on the lower surface of the annular collar 146. The first gear 119*a* of the gear member 119 held by the bearing 118 of the main body 114 is engaged with the driven gear 146*a*. As shown in FIG. 16, first ridges 147 are formed on the inner circumferential surface of the first cylindrical portion 144, are located in four positions equally divided in the circumferential direction, and are extended in the direction of the shaft center thereof. Each of guide rollers 151 of the first rotating body 111 described later is guided and rolled along each of the ridges 147, so that the first rotating body 111 can be reciprocated in the first cylindrical portion 144 in the direction of the shaft center thereof. The first cylindrical portion 144 is tilted in the direction of the shaft center thereof at a predetermined angle with respect to the vertical direction in a state where the medication cassette 103 is mounted on the cassette mounting portion 102.

As shown in FIG. 15, the second cylindrical portion 145 is arranged above the first cylindrical portion 144, has an upper end opening formed to be tilted with respect to the plane orthogonal to the shaft center thereof, and is located in the horizontal plane. The inner circumferential surface of the second cylindrical portion 145 is formed to be gradually bulged to the inside diameter side from the position where the dimension in the direction of the shaft center thereof is the shortest (the shortest position) toward the vicinity portion of the position where the discharging portion 139 is arranged (the dimension in the direction of the shaft center thereof is the longest: the longest position). As shown in FIG. 18, more specifically, the inner circumferential surface of the second cylindrical portion 145 is gradually bulged inward from the shortest position to the longest position clockwise in plan view (that is, the inner circumferential surface of the second cylindrical portion 145 is gradually close to the rotation center clockwise in plan view), so that the bulged dimension is the largest in the longest position (hereinafter, this region is a first bulged region 148). The inner surface of the upper opening of the first bulged region 148 has a curved surface 148*a*. A second bulged region 149 beyond the longest position is curved to the outside diameter side, so that a curved surface 149*a* and a flat portion 150 on which the discharge guide piece 142 is located are formed on the upper side thereof.

Figure 19:
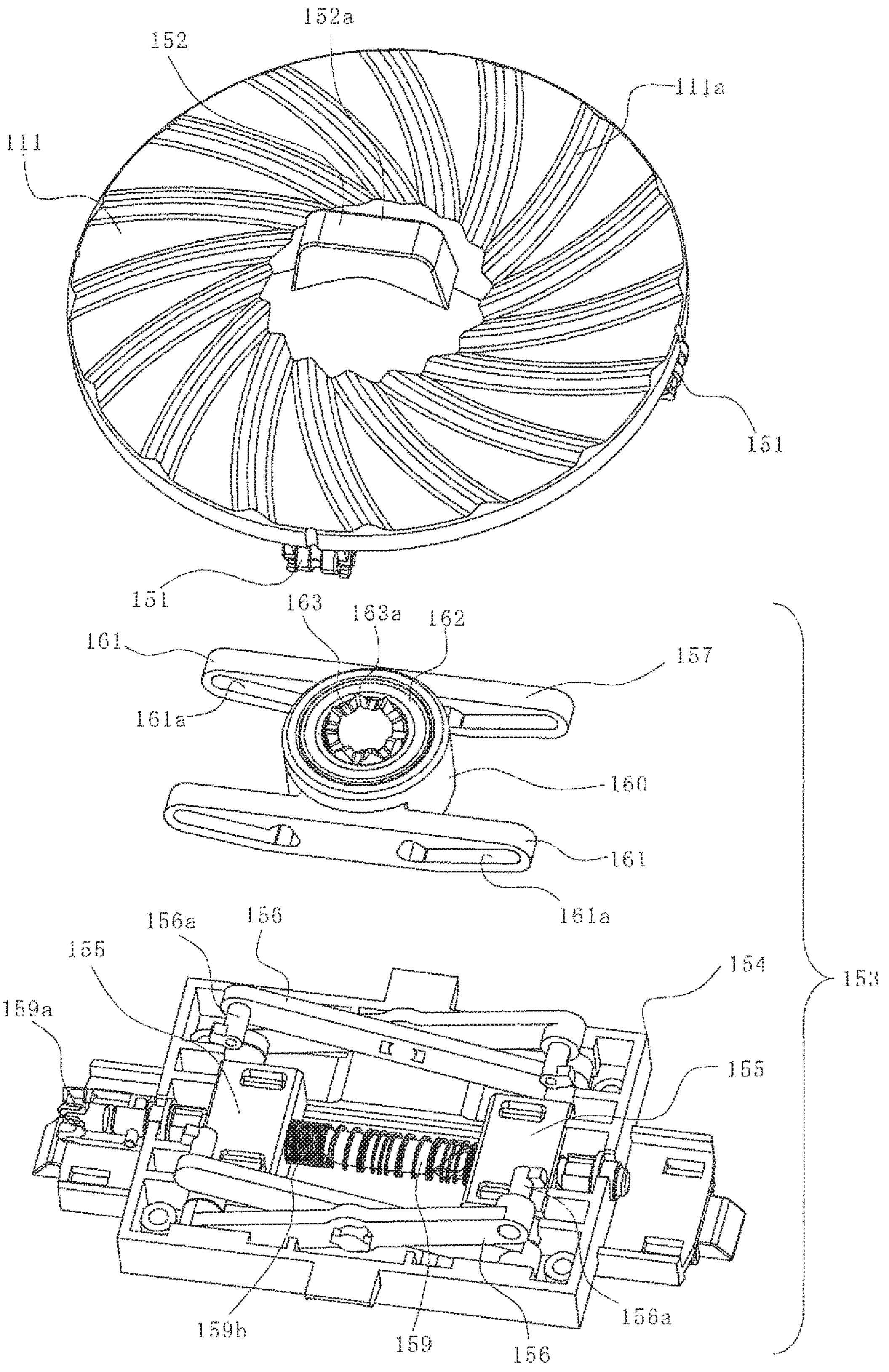
FIG. 19 is a perspective view of the first rotating body and a raising/lowering mechanism of the medication cassette of FIG. 12.
Figure 20:
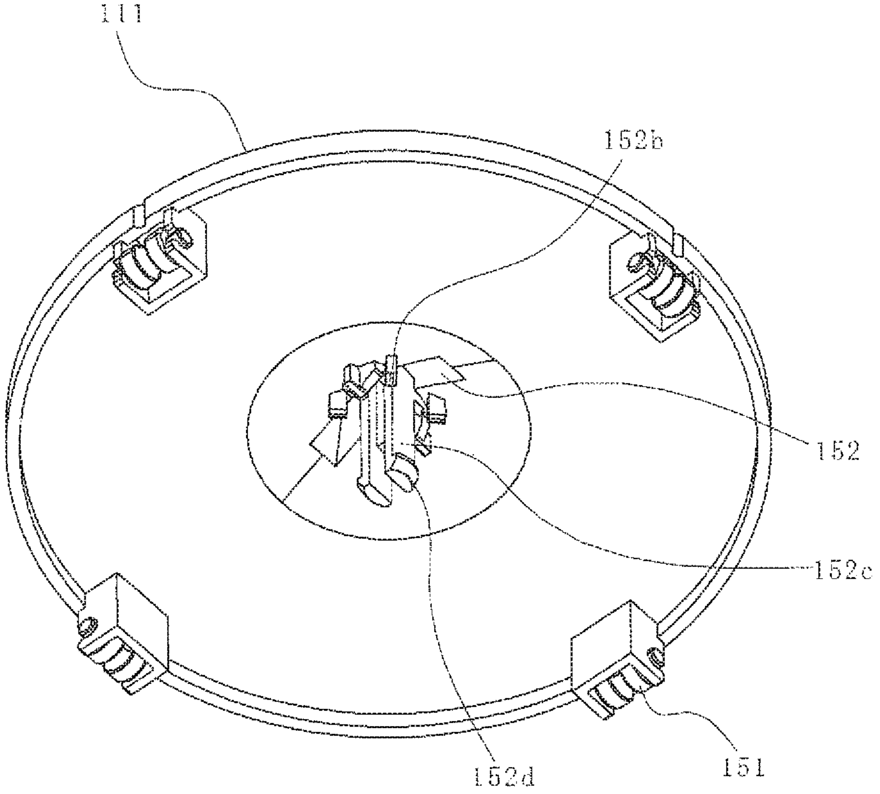
FIG. 20 is a perspective view showing a state where the first rotating body of FIG. 19 is seen from the lower side thereof.

As shown in FIGS. 19 and 20, four guide rollers 151 are rotatably mounted in positions equally divided on the outer circumference of the bottom surface of the first rotating body 111. Groove-shaped portions are formed on the outer periphery of the guide rollers 151. The first ridges 147 (see FIG. 18) formed on the inner circumferential surface of the first cylindrical portion 144 are located in the groove-shaped portions, so that the guide rollers 151 are rolled along the first ridges 147. With this, the first rotating body 111 can be reciprocated in the direction of the shaft center of the first cylindrical portion 144. In addition, when the first cylindrical portion 144 is rotated about the shaft center thereof, since the first ridges 147 are located in the groove-shaped portions of the guide rollers 151, the first rotating body 111 can be rotated about the shaft center thereof (a first rotational shaft) together with the first cylindrical portion 144.

The center portion of the first rotating body 111 is conically bulged, so that an engaging member 152 is mounted at the center thereof. Plural ridges 111*a* are formed on the upper surface of the first rotating body 111, and are helically extended from the rotation center to the opposite side of the rotating direction. With this, the medications receive the rotational force of the first rotating body 111, are influenced by the helical shape of the ridges 111*a*, and are conveyed in the rotating direction and the outside diameter direction.

As shown in FIGS. 19 and 20, the engaging member 152 has a projected portion 152*a* projected toward the upper side of the first rotating body 111, a gear 152*b* which is projected toward the lower side thereof and has plural projections arranged at a predetermined pitch in the circumferential direction, and a pair of legs 152*c* projected from the inside of the gear 152*b*. The gear 152*b* is engaged with a gear 163*a* of a bearing member 157 described later. Each of the legs 152*c* has an engaging pawl 152*d* which is inserted through the center hole of a shaft member 163 of the bearing member 157 described later and is engaged with the opening edge of the lower end thereof.

(1-4-3. The Raising/Lowering Mechanism 153)

Figure 21:
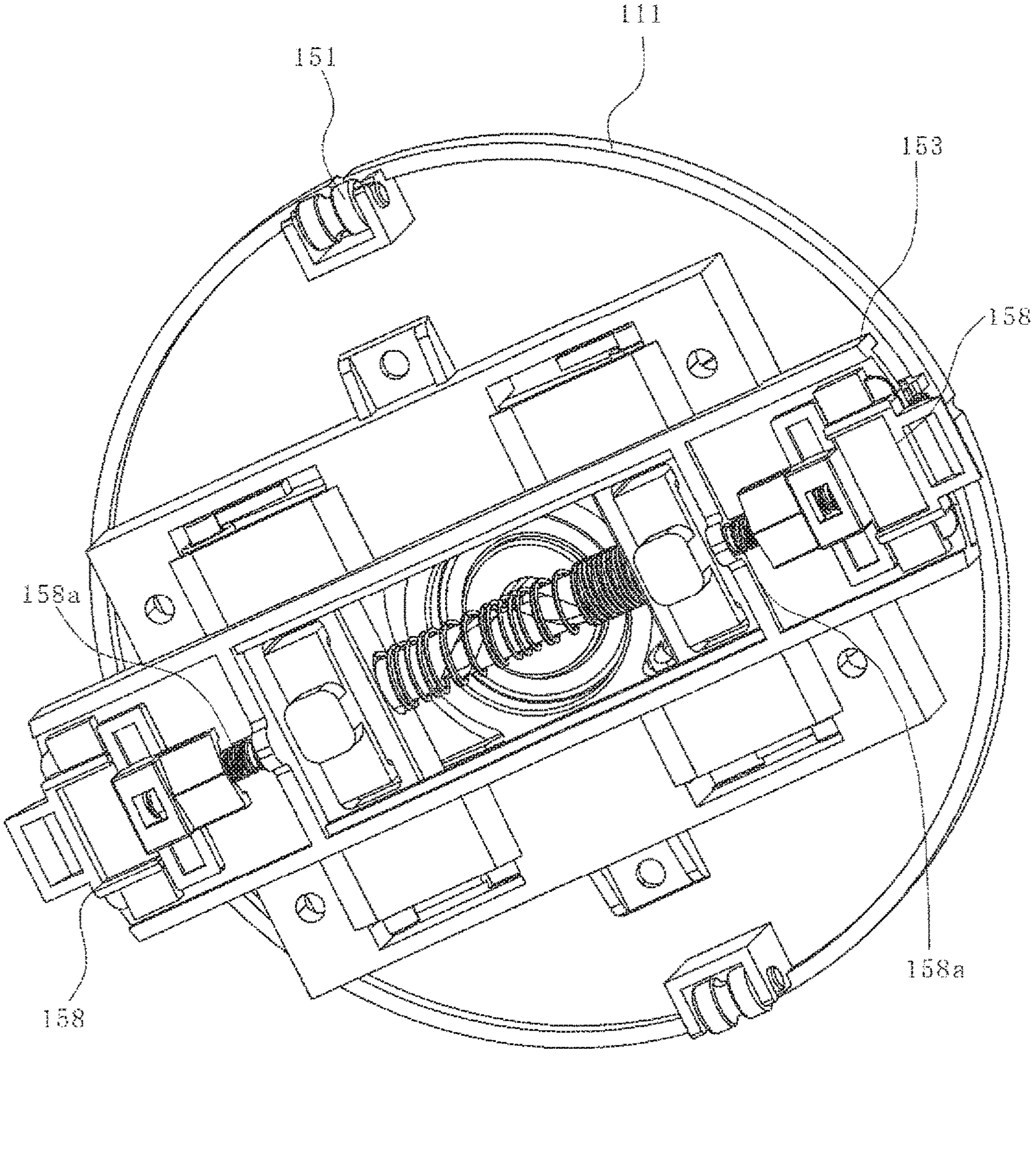
FIG. 21 is a perspective view showing a state where the first rotating body integrated with the raising/lowering mechanism of FIG. 19 is seen from the lower side thereof.

As shown in FIGS. 19 and 21, the raising/lowering mechanism 153 is arranged on the lower side at the center of the first rotating body 111. In the raising/lowering mechanism 153, a pair of slide blocks 155 which are slid to be contacted and separated are provided in a rectangular frame 154, and can rotate link members 156 (dimension variable members), so that the first rotating body 111 can be raised and lowered via the bearing member 157.

Engagement pieces 158 are mounted at the centers on both ends of the lower surface of the rectangular frame 154, and are biased by springs 158*a* to be projected toward the both end sides thereof.

The slide blocks 155 are arranged in the rectangular frame 154, and can be contacted and separated along the center line thereof. That is, the screw shaft 159 is screwed into the centers of the slide blocks 155. The screw shaft 159 is rotatably supported by both end walls of the rectangular frame 154, and has a helical groove formed on the outer circumferential surface thereof. The male screw (helical groove) formed on the outer circumferential surface of the screw shaft 159 is different in the helical direction of the helical groove formed of one slide block 155 and the other slide block 155 (when the direction of the helical groove formed on one end side of the screw shaft 159 is the clockwise direction seeing the other end side from one end side, the direction of the helical groove formed on the other end side is the counterclockwise direction seeing one end side from the other end side). With this, when the screw shaft 159 is rotated forward and rearward, the slide blocks 155 are contacted and separated. In addition, the driven gear 159*a* is provided at one end of the screw shaft 159, so that power from the first driving motor 174 is transmitted via the driven gear 159*a*. Further, a spring 159*b* is fitted onto the screw shaft 159, and biases the slide blocks 155 to both ends.

The link members 156 are rotatably connected at the centers thereof to be arranged inside both sides of the rectangular frame 154. One end of each of the link members 156 is rotatably connected to both side surfaces of each of the slide blocks 155. In addition, a shaft 156*a* projected inward is provided at the other end of each of the link members 156.

The bearing member 157 has a circular cylindrical portion 160, and a pair of arms 161 extended from the circular cylindrical portion 160 in the directions opposite to each other. The circular cylindrical shaft member 163 is provided in the circular cylindrical portion 160 via a bearing 162, and is rotatably supported. The mountain-shaped gear 163*a* is formed at the upper opening end of the shaft member 163 in the circumferential direction thereof. A long hole 161*a* is formed in each of the arms 161, where the shaft 156*a* provided at the other end of the link member 156 is slidably arranged.

When the first driving motor 174 is driven to rotate the screw shaft 159, the slide blocks 155 are contacted and separated, so that the link members 156 are rotated. Consequently the first rotating body 111 having the above mentioned configuration is reciprocated in the direction of the shaft center thereof. The upward moved position of the first rotating body 111 is regulated so that part of the first rotating body 111 is abutted onto an abutment piece, not shown, whereby part of the first rotating body 111 has substantially the same height as the second rotating body 112. In addition, the first rotating body 111 is moved to the lowermost side in the position where the slide blocks 155 are extremely separated from each other, so that the medication storing volume of a medication storing portion 164 (see FIG. 12) is maximum.

In a state where the medication cassette 103 is removed from the cassette mounting portion 102, the first rotating body 111 rotates the link members 156 mainly by its own weight, and is then moved to the lower side of the first cylindrical portion 144. With this, a sufficient space which can store the medications can be automatically obtained in the medication cassette 103 without requiring additional power.

The second rotating body 112 is annularly formed at a predetermined width, and is arranged substantially around the upper end opening of the second cylindrical portion 145. As shown in FIG. 15, an annular groove 112*a* and the driven gear 112*b* located therebelow are formed on the outer circumferential surface of the second rotating body 112. The first guide rollers 131 mounted on the main body 114 of the cassette main body 109 are rollably located in the annular groove 112*a*, so that the second rotating body 112 is rotatably supported. The driving gear 108*j* provided in the cassette mounting portion 102 described later is engaged with the driven gear 112*b*, so that the second rotating body 112 can be rotationally driven about the shaft center extended in the vertical direction (a second rotational shaft). The second rotating body 112 may be set to be rotated faster than the first rotating body 111. With this, the interval during which the medications are conveyed from the first rotating body 111 to the second rotating body 112 can be increased, so that the number of dispensed medications can be prevented from being error-detected.

(1-5. The Conveying Unit 6)

As shown in FIG. 4, the conveying unit 6 has first horizontal rails 91 which are provided between the medication feeding units 5 provided at the both side of the apparatus main body 8 and are fixed to the upper and lower sides of the apparatus main body 8, a vertical rail 92 which are mounted on the first horizontal rails 91 to be movable in the front-rear direction, a second horizontal rail 93 which is mounted on the vertical rail 92 to be movable in the upward and downward direction, and an arm unit 165 which is mounted on the second horizontal rail 93 to be movable in the horizontal direction.

Figure 22:
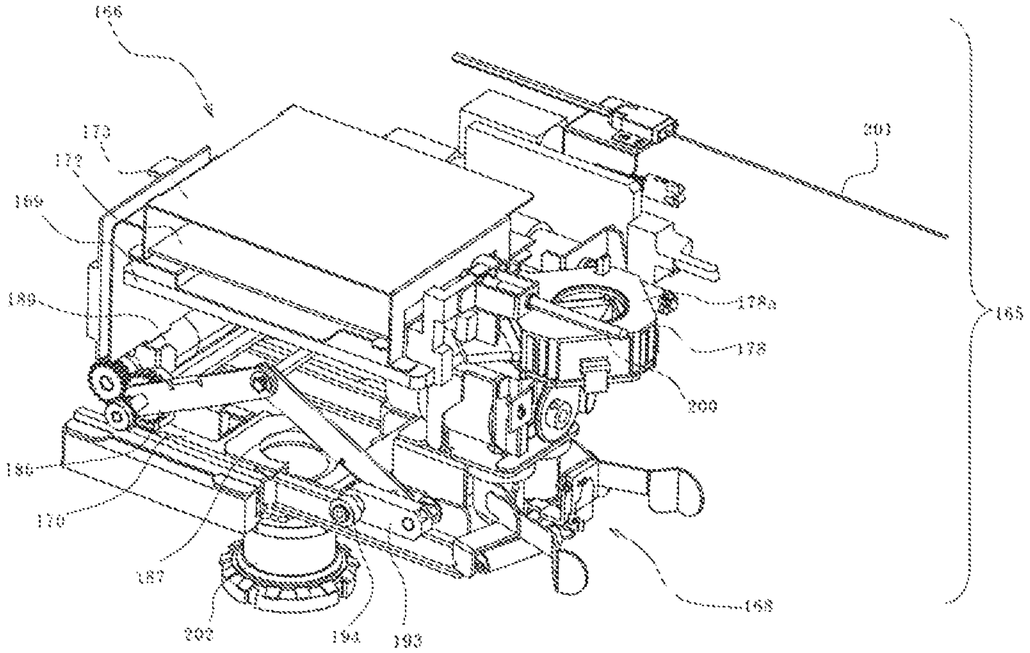
FIG. 22 is a perspective view showing a state where one guide block is removed from an arm unit of FIG. 4 and a state where a chuck member is located in the extreme projected position.
Figure 23:
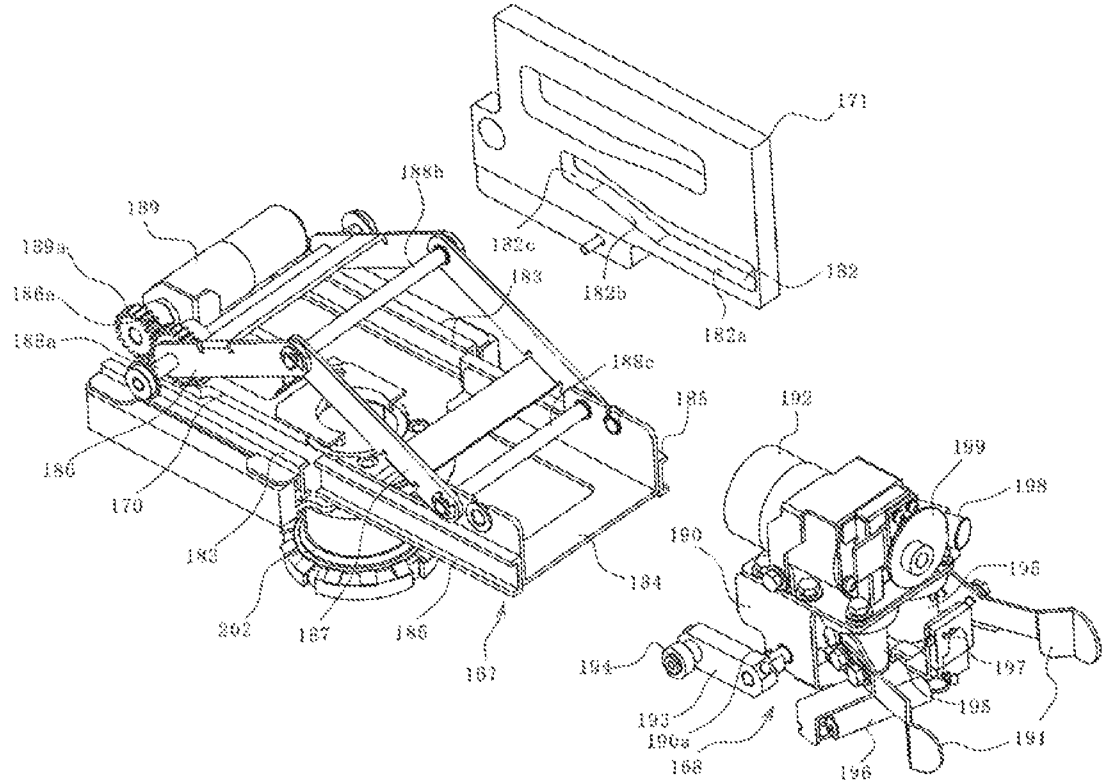
FIG. 23 is an exploded perspective view of a unit main body, a chuck main body, and the guide block of FIG. 22.

As shown in FIGS. 22 and 23, in the arm unit 165, a slider 167 is reciprocatably arranged in a unit main body 166, and a chuck member 168 is mounted on the slider 167.

The unit main body 166 is formed in a substantially rectangular cylindrical shape in such a manner that a top plate 169 and a base plate 170 are opposite in the upward and downward direction and both sides thereof are connected by guide blocks 171 (in FIG. 23, one of them is not shown). A first control substrate 172 is arranged on the upper surface of the top plate 169, so that the upper side thereof is covered by a cover plate 173.

Figure 25:
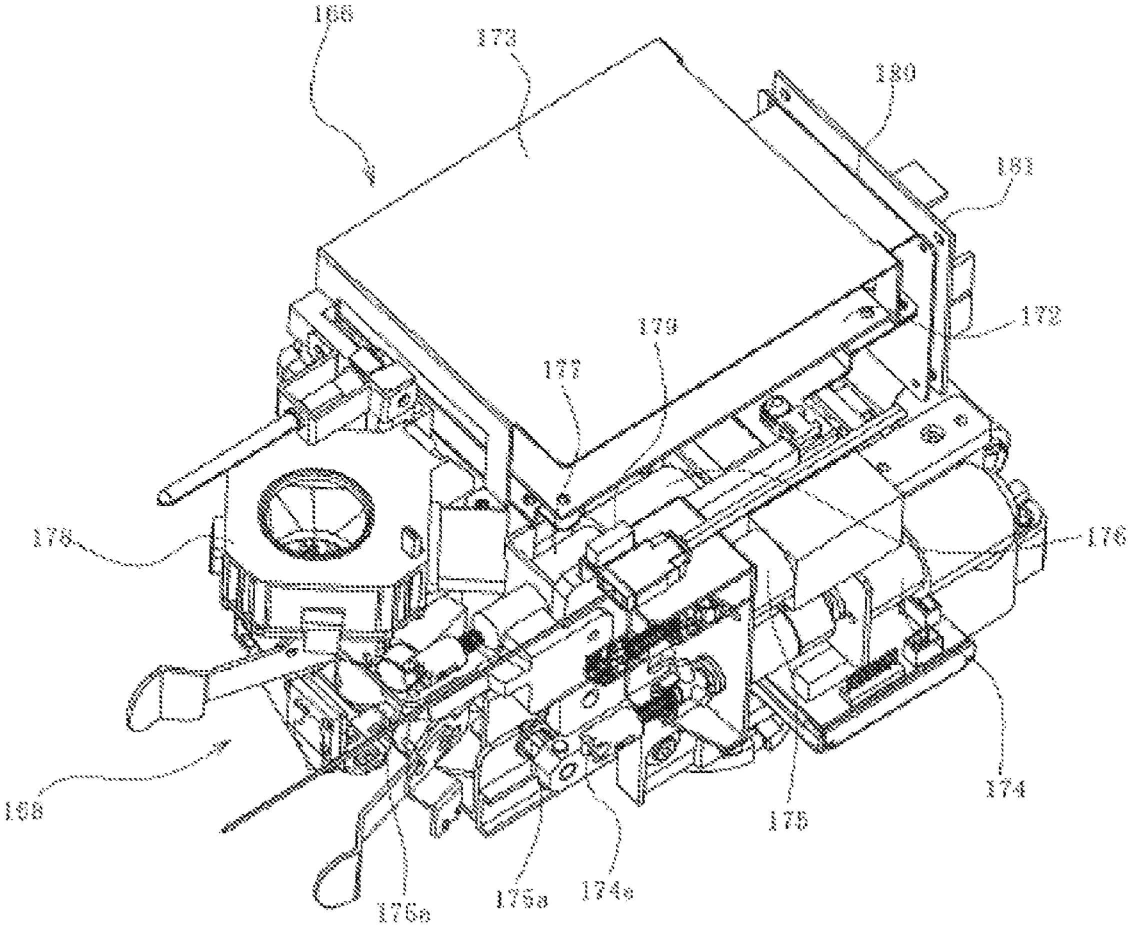
FIG. 25 is a perspective view showing a state where

As shown in FIG. 25, the first driving motor 174, the second driving motor 175, and a third driving motor 176 are arranged sideward of the unit main body 166.

The first driving motor 174 is integrated with the driving gear 174*a* at the end of the rotational shaft thereof. The driving gear 174*a* is engaged with the driven gear 108*i* of the cassette mounting portion 102 provided on the support panel 101. For this, when the first driving motor 174 is driven, the screw shaft 159 is rotated via the driving gear 174*a* and the driven gear 159*a*, so that the slide blocks 155 are reciprocated. As a result, the link members 156 are rotated to raise and lower the first rotating body 111 via the bearing member 157. A magnet type clutch 177 is provided midway the rotational shaft of the first driving motor 174, and blocks an excessive load which acts on the first rotating body 111 side.

The second driving gear 175*a* integrated with the end of the rotational shaft of the second driving motor 175 is engaged with the driven gear 108*n* provided on the driven gear member 108*l* of the cassette mounting portion 102. The driven gear member 108*l* has the bevel gear 108*m*, which is engaged with the bevel gear 108*k* to rotate the driving gear 108*j*. The driving gear 108*j* is engaged with the driven gear 112*b* of the medication cassette 103. For this, when the second driving motor 175 is driven, the second rotating body 112 is rotated via the driven gear 112*b*.

A driving gear 176*a* integrated with the end of the rotational shaft of the third driving motor 176 is engaged with the second gear 119*b* of the gear member 119, and the first gear 119*a* is engaged with the driven gear 146*a* of the first cylindrical portion 144. When the third driving motor 176 is driven, the first cylindrical portion 144 is rotated.

As shown in FIG. 22, on the front end side of the top plate 169, provided are a first medication detection sensor 178 for detecting the medications dispensed from the medication cassette 103 and the second medication detection sensor 179 for detecting the medications conveyed on the upper surface of the second rotating body 112. The first medication detection sensor 178 has plural sensors arranged in a rectangular frame 178*a*, and detects the number of medications passed through the center hole. The second medication detection sensor 179 detects the medications conveyed by the second rotating body 112 through the through-hole 115*a* (see FIG. 12) formed in the cover 115 of the medication cassette 103. This assumes that medication running-out does not occur, for instance, that jamming (medication clogging) occurs, regardless of not detecting the medications by the first medication detection sensor 178.

A mounting plate 180 is provided on the rear end side of the top plate 169 and is extended to the rear end opening of the unit main body 166, and a second control substrate 181 is mounted on the outer surface thereof. As shown in FIG. 23, guide grooves 182 are formed in the opposite surfaces of the guide blocks 171. Each of the guide grooves 182 has a first horizontal portion 182*a* from the front end side to the rear end side of the unit main body 166, an inclined portion 182*b* extended diagonally upward therefrom, and a second horizontal portion 182*c* further extended horizontally. Slider guides 183 are arranged in the inside portions of the guide blocks 171 on both sides of the base plate 170.

In the slider 167, slide rails 185 are fixed to both sides of a mounting plate 184 having a bottom surface and both side surfaces, and are slidably guided by the slider guides 183. The driving force of the motor is transmitted to the slider 167 via link mechanisms. Each of the link mechanisms has a first link member 186, and a second link member 187 rotatably connected to the first link member 186.

One end of the first link member 186 is rotatably mounted on a first support shaft 188*a* rotatably supported between the guide blocks 171 on both sides. A driven gear 186*a* is provided on the first support shaft 188*a* on the side of one of the first link members 186, and is used by a driving gear 189*a* provided on the rotational shaft of a driving motor 189. The other end of the first link member 186 is rotatably connected to one end of the second link member 187 via a second support shaft 188*b*. The other end of the second link member 187 is rotatably connected to each of the side surfaces of the mounting plate 184 about a third support shaft 188*c*. Therefore, when the driving motor 189 is rotationally driven forward and rearward, the first link members 186 and the second link members 187 are rotated via the gears 189*a* and 186*a*, so that the mounting plate 184 is reciprocated on the slide rails 185 while being guided by the slider guides 183.

The chuck member 168 has a chuck main body 190 having a planar body assembled in a rectangular shape, a pair of sandwiching pieces 191 mounted on the chuck main body 190 to be rotatable about a pair of rotational shafts, and a driving motor 192 for opening and closing the sandwiching pieces 191.

The chuck main body 190 is supported on each of the side surfaces of the mounting plate 184 to be rotatable about the rotational shaft 190*a*. An arm 193 is integrated with both ends of each of the rotational shafts 190*a*, and a guide roller 194 is rotatably mounted on the end portion thereof. The guide roller 194 is rolled in the guide groove 182 formed in the guide block 171. Each of the sandwiching pieces 191 is fixed to each of rotating bodies 195 provided in parallel. The rotating bodies are synchronously rotated so that the upper ends thereof (which may be gears) are engaged. A spring 196 is engaged with the extended portion from each of the rotating bodies 195, and biases the sandwiching pieces in the direction in which the end portions thereof are close to each other. A bottle detection sensor 197 for detecting the vial bottle 9 is mounted on one of the extended portions. A pressing receiving portion 198 is formed in the portion extended from one of the rotating bodies 195 and projected from the upper surface of the chuck main body 190. An eccentric cam 199 is integrated with the rotational shaft of the driving motor 192. The eccentric cam 199 is pressed onto the pressing receiving portion 198 to rotate one of the rotating bodies 195, and rotates the other rotating body 195 in synchronization with this to open and close the sandwiching pieces 191.

When the chuck member 168 is reciprocated together with the slider 167 to be moved to the rear side, the guide rollers 194 are moved in the guide grooves 182 of the guide blocks 171 from the first horizontal portions 182*a* to the inclined portions 182*b*. As a result, the chuck member 168 is gradually tilted to be capable of tilting the sandwiched vial bottle. The guide rollers 194 reach the second horizontal portions 182*c* so that the tilted state of the chuck member 168 is stable. In this position, the medications which are dispensed from the medication cassette 103 and are then passed through the first medication detection sensor 178 can be collected into the vial bottle sandwiched by the chuck member 168.

A projection piece 200 is engaged with the engagement receiving portion (not shown) of the medication cassette 103 to position the arm unit 165 into the correct position, and a detection rod 201 detects whether or not the arm unit 165 is in the correct position. The unit main body 166 can be rotated about a rotational shaft 202.

(1-6. The Discharging Units 7)

Figure 26:
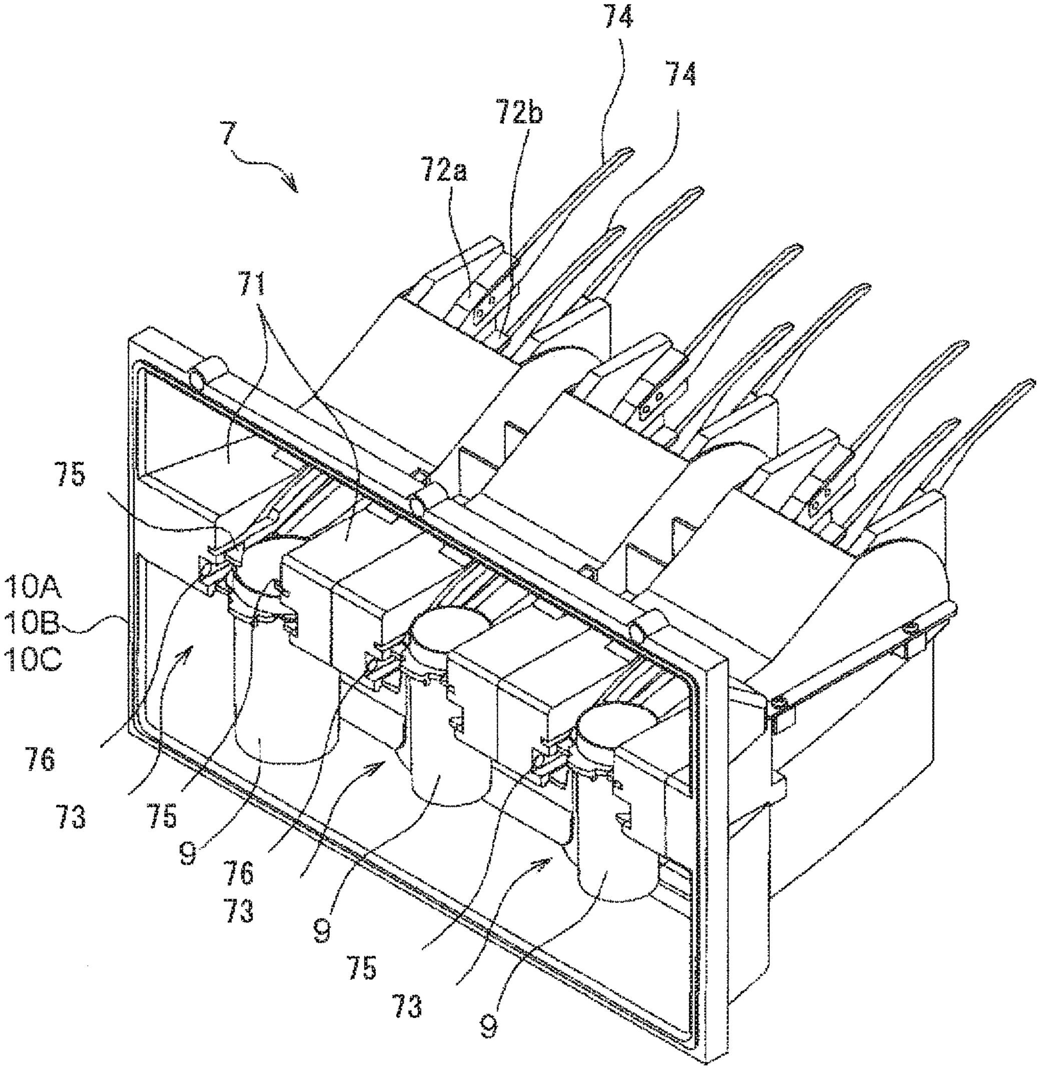
FIG. 26 is a perspective view showing each discharging unit of FIG. 4.

As shown in FIG. 26, each of the discharging units 7 is provided with a total of nine holding members 71 so that three pairs of left and right holding members 71 are provided to each of the three discharge windows 10A, 10B, and 10C. Two upper and lower slopes 72*a* and 72*b* are provided in the pair of holding members 71, the upper ends thereof are located in the apparatus main body 8, and the lower ends thereof are located in the discharge windows 10A, 10B, and 10C, thereby forming a discharge port 73. Guide members 74 are mounted at the upper ends of the slopes 72*a* and 72*b*, and are extended diagonally upward. The upper surfaces of the guide members 74 form slopes continued to the slopes of the holding members 71. Stoppers 75 are mounted at the lower ends of the slopes 72*a* and 72*b*. The stoppers 75 are typically projected by the biasing force of a spring, not shown, in the directions opposite to each other to receive the vial bottle 9 slid down on the slopes 72*a* and 72*b*, and are retracted against the biasing force of the spring when the operator takes out the vial bottle 9, so that the vial bottle 9 is passed. The vial bottle 9 held by the holding members 71 is detected by a bottle detection sensor 76.

(1-7. The Controlling Unit 80)

Figure 27:
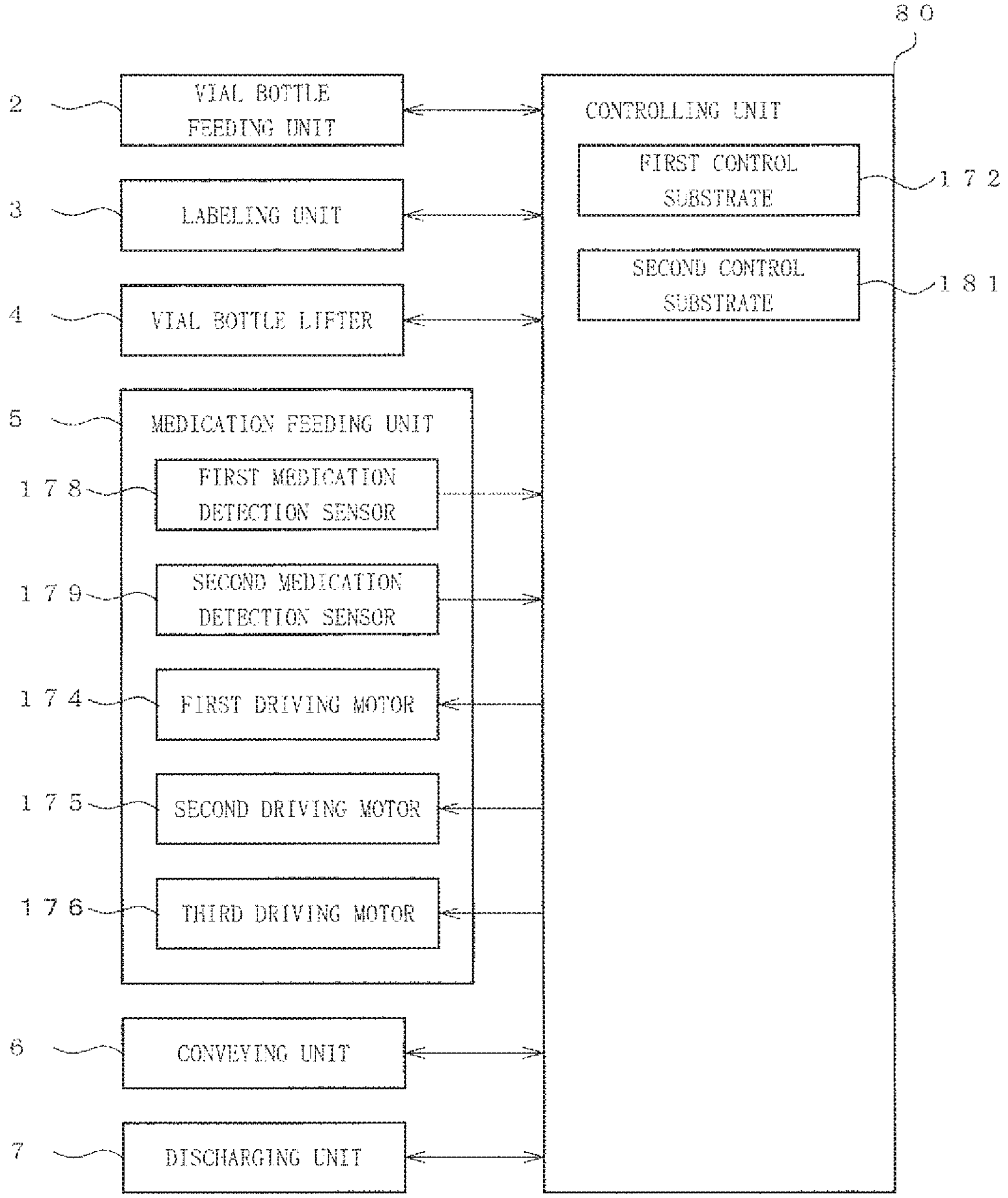
FIG. 27 is a block diagram of the medication filling apparatus according to this embodiment.

As shown in FIG. 27, the controlling unit 80 has the first control substrate 172, and the second control substrate 181, and receives prescription data from a server, not shown. The medication feeding unit 5 designates the medication cassette 103, and drivably controls each of the motors 174, 175, and 176 based on a detection signal from each of the sensors 178 and 179, thereby reliably dispensing the medications one by one for counting.

(2. Operation)

Figure 28:
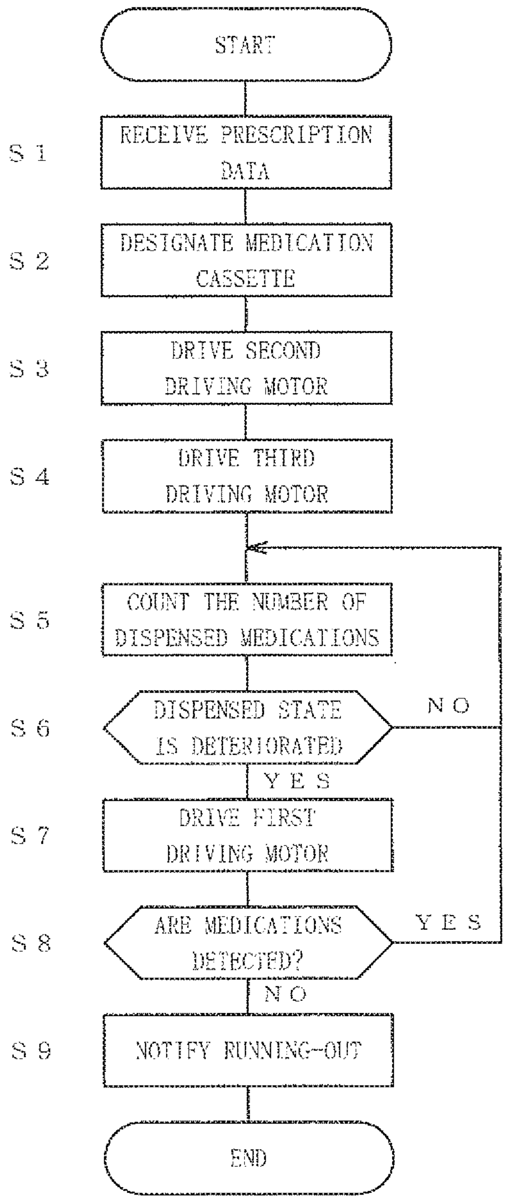
FIG. 28 is a flowchart showing the medication dispensing process of the medication filling apparatus according to this embodiment.

The operation of the medication filling apparatus having the configuration will be described with reference to the flowchart of FIG. 28.

That is, the controlling unit 80 receives prescription data from the server, not shown, (step S1), and then designates the medication cassette 103 in which the medications included in the prescription data are stored (step S2). The second driving motor 175 is driven based on the designated medication cassette 103 to start the rotation of the second rotating body 112 (step S3). Then, the third driving motor 176 is driven to start the rotation of the first rotating body 111 (step S4). With this, the medications stored in the medication cassette 103 are moved to the outer circumference side while being rotated by the rotation of the first rotating body 111. The first cylindrical portion 144 and the second cylindrical portion 145 are arranged diagonally to the vertical direction, so that the medications stored in the medication storing portion 164 are closest to the second rotating body 112 in the shortest position of the second cylindrical portion 145. For this, the medications moved to the outer circumference side are sequentially moved onto the second rotating body 112 mainly near the shortest position of the second cylindrical portion 145.

At this time, the size of the vial bottle is designated based on the prescription data, so that the conveyor 23 and the taking-out device 24 of the stocker 21 accommodating the vial bottle 9 are driven. With this, the vial bottle 9 is taken out by the paddle 25 of the taking-out device 24, and is then slid down the shoot 27 to be placed on the fork 28. The label printer 31 is driven to stick the label 33 with a predetermined matter printed thereon, onto the vial bottle 9.

Figure 24:
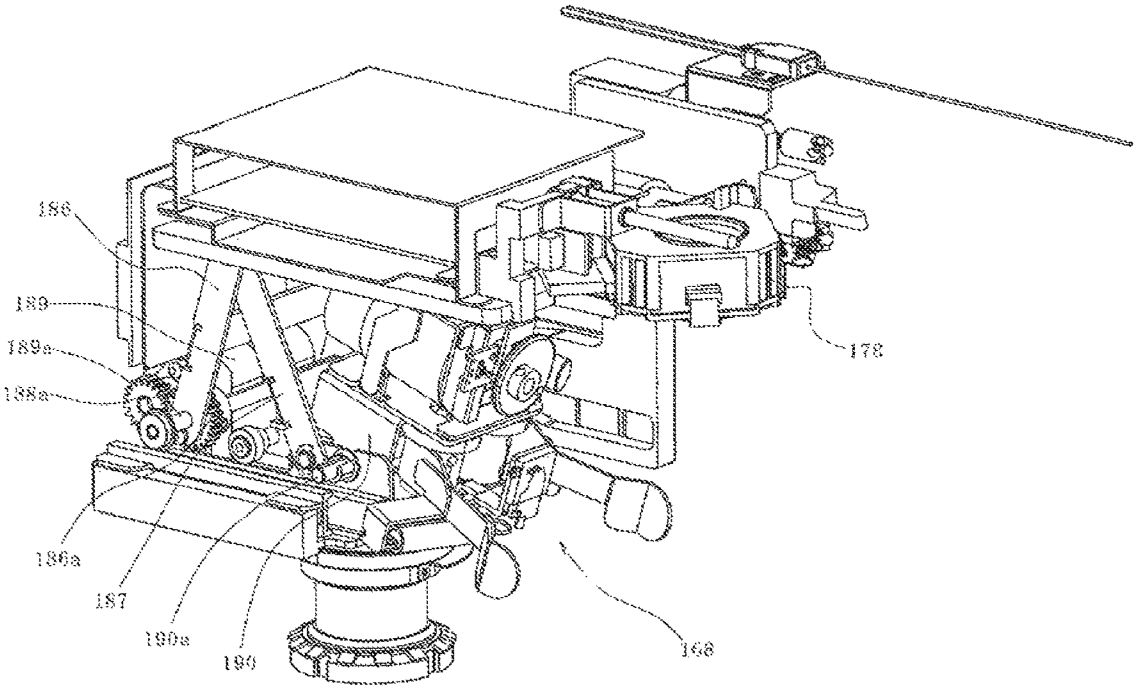
FIG. 24 is a perspective view showing a state where one guide block is removed from the arm unit of FIG. 4 and a state where the chuck member is located in the tilted position.

The conveying unit 6 is driven, so that the vial bottle 9 with the label 33 stuck thereonto is sandwiched between the sandwiching pieces 191 of the chuck member 168, and is then moved to the medication cassette 103 in which the corresponding medications included in the prescription data are stored. The vial bottle 9 is positioned in the dispensed position as follows. That is, the driving motor 189 is driven, and as shown in FIG. 24, the first link members 186 are rotated via the gears 189*a* and 186*a* counterclockwise about the first support shaft 188*a*. With this, the first link members 186 and the second link members 187 are erected, so that the slider 167 is drawn into the unit main body 166. The guide rollers 194 of the chuck member 168 mounted on the slider 167 are moved in the guide grooves 182 of the guide blocks 171 from the first horizontal portions 182*a* to the inclined portions 182*b*. With this, the chuck member 168 is gradually tilted, the guide rollers 194 reach the second horizontal portions 182*c*, and the sandwiched vial bottle 9 is positioned in the tilted position.

The medications moved onto the second rotating body 112 are detected by the second medication detection sensor 179 through the through-hole 115*a* while being conveyed by the rotation of the second rotating body 112. The stacked medications are returned into the medication storing portion 164 by the height regulation member 124. The medications remaining on the second rotating body 112 can be passed one by one since the exposed portion of the second rotating body 112 is gradually narrowed by the guide member 135. Other medications are smoothly returned into the medication storing portion 164 along the curved surface formed in the second cylindrical portion 145. The passed medications are guided by the guide member 135 and the discharge guide piece 142 to be discharged from the discharging portion 139. At this time, the medications are detected by the first medication detection sensor 178, so that the number of dispensed medications is counted (step S5).

The dispensed medications are collected into the vial bottle 9. The vial bottle 9 which is tilted as described above has a tilting angle substantially coinciding with the dispensing direction of the medications dispensed from the medication cassette 103. Therefore, the medications dispensed from the medication cassette 103 are smoothly stored into the vial bottle 9. When the filling of the medications into the vial bottle 9 is completed, the conveying unit 6 is driven to convey the medication cassette 103 held by the chuck member 168 to any one of the discharge ports 73 formed on the front surface of the apparatus main body 8. At this time, the driving motor 189 is driven, and as shown in FIG. 22, the first link members 186 are rotated via the gears 189*a* and 186*a* clockwise about the first support shaft 188*a*. With this, the first link members 186 and the second link members 187 are extended, so that the slider 167 is projected from the unit main body 166. The guide rollers 194 of the chuck member 168 mounted on the slider 167 are moved in the guide grooves 182 of the guide blocks 171 from the second horizontal portions 182*c* to the inclined portions 182*b* and the first horizontal portions 182*a*. With this, the chuck member 168 is gradually erected, and when the guide rollers 194 reach the first horizontal portions 182*a*, the sandwiched vial bottle 9 is positioned in the extreme projected position, that is, in the discharge port 73.

Although the medications in the medication storing portion 164 are sequentially dispensed in this way, but the position of the first rotating body 111 is moved upward according to the medication dispensed state. That is, whether or not there are the medications on the second rotating body 112 is detected by the second medication detection sensor 179, and then, when the medications cannot be detected or when the interval during which the medications discharged from the discharging portion 139 is detected by the first medication detection sensor 178 exceeds a predetermined time, whether or not the medication dispensed state is deteriorated is determined (step S6). When the medication dispensed state is deteriorated, the first driving motor 174 is driven (step S7), so that the first rotating body 111 is moved upward in the first cylindrical portion 144 via the gears 174*a* and 159*a*, the link members 156, and the bearing member 157. As a result, the medications in the medication storing portion 164 can be smoothly moved onto the second rotating body 112 according to the dispensed state. As shown in FIG. 10, even when the first rotating body 111 is moved to the uppermost position or is moved to the predetermined position before the uppermost position, when the medications are not detected by the second medication detection sensor 179 (which may be the first medication detection sensor 178) (step S8: NO), the need for medication filling is notified (running-out is notified) (step S9). Even when the medications are not detected by the second medication detection sensor 179, only when the time during which a medication detection signal is not outputted from the first medication detection sensor 178 exceeds the predetermined time, it may be determined that medication running-out occurs.

When the medications cannot be detected by the second medication detection sensor 179, the first driving motor 174 should be driven so that the first rotating body 111 is moved upward. Even when the first driving motor 174 is rotated over a predetermined time, when the medications cannot be detected by the second medication detection sensor 179, the need for medication filling is preferably notified. In addition, even when during the driving of the first driving motor 179, the first rotating body 111 reaches the upper limit position and cannot be further moved upward, the driving force of the first driving motor 179 is blocked by the clutch 177 and is not transmitted to the first rotating body 111 side. For this, an excessive load is not applied to the first driving motor 174, which cannot result in burnout. In step S8, even when the first driving motor 174 is rotated over the predetermined time, when the medications cannot be detected by the first medication detection sensor 178, medication running-out may be determined and notified.

When the need for medication filling into the medication storing portion 164 is notified, the medications should be filled by removing the medication cassette 103 from the cassette mounting portion 102. In this case, the screw shaft 159 is disengaged from the driving gear 108*b* on the cassette mounting portion side so as to be rotatable. As a result, as shown in FIG. 12, the first rotating body 111 is moved to the lowermost position by its own weight without requiring an additional power source, so that the medications can be filled with the volume of the medication storing portion 164 being maximum.

In the medication dispensing process, when the time during which the medications are not detected by the first medication detection sensor 178 exceeds the predetermined time, when the medications are detected by the second medication detection sensor 179, it may be determined that an error occurs. As the error, it is considered that, for instance, the medications remaining in the medication cassette 103 cannot be dispensed into the vial bottle due to jamming (medication clogging). When the raising/lowering operation of the first rotating body 111 is controlled only by the detection signal from the first medication detection sensor 178, in the above case, the raising operation of the first rotating body 111 is continued so that the medications can be overflown. However, by providing the second medication detection sensor 179, such a disadvantage can be prevented from occurring. When it is determined that an error occurs, as described above, occurrence of an error may be notified. Examples of the notification include sound notification and visible notification using a lamp and monitor provided in the medication filling apparatus. In this embodiment, the direction of the shaft center of the cylindrical body 110 is tilted with respect to the vertical direction, but may coincide with the vertical direction.

The invention claimed is:

1. A medication filling apparatus comprising:

an apparatus main body;

a medication cassette, being removably mounted on the apparatus main body, having a cylindrical body for storing medications, a first rotating body reciprocatable in the cylindrical body in a direction of a shaft center thereof, and a second rotating body arranged on an outer circumference of said cylindrical body;

a conveying unit, being movably mounted on the apparatus main body, having a first driving motor for raising the first rotating body, a second driving motor for rotating the second rotating body, and a third driving motor for rotating the first rotating body, wherein the conveying unit conveys a vial bottle to the medication cassette, and fills the medications stored in the cylindrical body into the vial bottle by driving the first driving motor to raise the first rotating body, by driving the second driving motor to rotate the second rotating body and by driving the third driving motor to rotate the first rotating body.

2. The medication filling apparatus according to claim 1, wherein the conveying unit conveys the vial bottle to a discharging portion of the apparatus main body after filling the medications stored in the medication cassette into the vial bottle.

3. The medication filling apparatus according to claim 1, further comprising a labeling unit for labeling a surface of the vial bottle, wherein the conveying unit conveys the vial bottle labeled at the labeling unit to the medication cassette.

4. The medication filling apparatus according to claim 1, further comprising a cassette mounting portion on which the medication cassette is mounted, wherein the cassette mounting portion has plural gears engaged with each other, wherein a first gear out of the plural gears can operate simultaneously with a rotational shaft of the first driving motor, while a second gear out of residual gears can operate simultaneously with the first rotating body.

5. The medication filling apparatus according to claim 4, wherein the first gear is a worm gear.

6. The medication filling apparatus according to claim 1, wherein the cassette mounting portion has plural gears engaged with each other, wherein a third gear out of the plural gears can operate simultaneously with a rotational shaft of the second driving motor, while a fourth gear out of residual gears can operate simultaneously with the second rotating body.

* * * * *